US012631878B1

(12) United States Patent (10) Patent No.: US 12,631,878 B1

Cole et al. (45) Date of Patent: May 19, 2026

(54) LIGHT CONTROL DEVICE

(71) Applicant: ENVISICS LTD, Milton Keynes (GB)

(72) Inventors: Alexander Cole, Milton Keynes (GB);
Daniel Molina, Milton Keynes (GB)

(73) Assignee: Envisics Ltd, Milton Keynes (GB)

( * ) Notice: Subject to any disclaimer, the term of this
patent is extended or adjusted under 35
U.S.C. 154(b) by 0 days.

(21) Appl. No.: 19/287,756

(22) Filed: Jul. 31, 2025

(30) Foreign Application Priority Data

| Feb. 18, 2025 | (GB) | ..................................... | 2502382 |
|---|---|---|---|
| Feb. 18, 2025 | (GB) | ..................................... | 2502388 |
| Feb. 18, 2025 | (GB) | ..................................... | 2502390 |
| Feb. 18, 2025 | (GB) | ..................................... | 2502393 |
| Feb. 18, 2025 | (GB) | ..................................... | 2502396 |
| Apr. 24, 2025 | (GB) | ..................................... | 2506223 |

(51) Int. Cl.
G02B 27/01 (2006.01)

(52) U.S. Cl.
CPC .. G02B 27/0103 (2013.01); *G02B 2027/0109*
(2013.01); *G02B 2027/011* (2013.01); *G02B*
*2027/0118* (2013.01); *G02B 2027/0145*
(2013.01)

(58) Field of Classification Search
None
See application file for complete search history.

(56) References Cited

U.S. PATENT DOCUMENTS

| 2015/0346491 A1 | 12/2015 | Christmas |
| 2016/0062114 A1 | 3/2016 | Amarilio |

| 2022/0252879 A1 | 8/2022 | Christmas | |
| 2022/0404770 A1 | 12/2022 | Christmas | |
| 2023/0064690 A1 | 3/2023 | Smeeton | |
| 2023/0204947 A1* | 6/2023 | Konno | ................... G03B 13/02 |
| | | | 359/613 |
| 2023/0204953 A1 | 6/2023 | Smeeton | |
| 2023/0314802 A1 | 10/2023 | Smeeton | |
| 2023/0341680 A1* | 10/2023 | Wille | ................. G02B 27/0018 |

(Continued)

FOREIGN PATENT DOCUMENTS

| DE | 102015224939 A1 * | 6/2017 | ......... G02B 27/0101 |
| GB | 2552850 A | 2/2018 | |

(Continued)

OTHER PUBLICATIONS

Combined Search and Examination Report in UK patent Application GB2506223.3, dated Oct. 22, 2025.

*Primary Examiner* — Derek S. Chapel
(74) *Attorney, Agent, or Firm* — McDonnell Boehnen Hulbert & Berghoff LLP

(57) ABSTRACT

A head-up display is provided. The head-up display comprises an optical component comprising a surface arranged, during head-up display operation, in a configuration that is conducive to sunlight glare. The head-up display further comprises a reflection suppression device arranged to receive sunlight on an optical path to the surface. The reflection suppression device comprises a lattice structure. The lattice structure extends in a first direction and a second direction. The lattice structure forms a plurality of channels extending in a third direction. Each channel is defined by a respective axis having a first angle in the first direction and second angle in the second direction. The first angle is a function of the first direction.

30 Claims, 26 Drawing Sheets

(56)                 References Cited

U.S. PATENT DOCUMENTS

| | | | |
|---|---|---|---|
| 2024/0019694 A1 * | 1/2024 | Dobler | B60K 35/22 |
| 2024/0069340 A1 * | 2/2024 | Krawczyk | G02B 27/0081 |
| 2024/0077651 A1 | 3/2024 | Smeeton | |
| 2025/0164785 A1 | 5/2025 | Lin | |

FOREIGN PATENT DOCUMENTS

| | | | | |
|---|---|---|---|---|
| GB | 2627988 A * | 9/2024 | | B60K 35/415 |
| GB | 2635578 A | 5/2025 | | |
| WO | 2024188479 A1 | 9/2024 | | |
| WO | 2025104283 A1 | 5/2025 | | |
| WO | 2025104313 A1 | 5/2025 | | |

* cited by examiner

300

540

520

526b 524b   526a   524a

522

530 y x z

2200

2100b

2100a

2300

2200

2100b

2100a

2400

650

1000, 1800

642

640

LIGHT CONTROL DEVICE

CROSS-REFERENCE TO RELATED APPLICATIONS

This application claims the benefit of priority of each of United Kingdom Patent Applications no. 2502382.1, 2502388.8, 2502390.4, 2502393.8, 2502396.1, and 2506223.3, each of which is hereby incorporated herein by reference in its entirety.

FIELD

The present disclosure relates to a display system comprising a light control layer. More broadly, the present disclosure relates to a light control layer, a reflection suppression device and a glare mitigation device. The present disclosure further relates to methods of mitigating glare when using a display system comprising a light control layer. Some embodiments relate to a holographic projector, picture generating unit or head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

In general terms, there is provided a light control device or glare mitigation device for display light. In embodiments, the light control device or glare mitigation device is for display light of a display system. The display light may be spatially modulated light. The display system may be arranged to relay the spatially modulated light to a viewing window/plane or eye-box. In some embodiments, the display system is a holographic display system and the spatially modulated light is light that is spatially modulated in accordance with a hologram. The spatially modulated light may be referred to as a holographic wavefront. In other embodiments, the display light is spatially modulated in accordance with an image. The image may be a holographic reconstruction of an image formed from a hologram of the image. The light control device of the present disclosure provides a means for controlling reflections of ambient light to prevent or suppress glare from reaching the viewing window while allowing the spatially modulated light to reach the viewing window. For example, the display device may comprise an optical component comprising a reflective surface. In some embodiments, the optical component is a waveguide, but the present disclosure is not limited to these embodiments. In the absence of the light control device, ambient light may be reflected by the reflective surface towards the viewing window/eye-box of the display device thus forming glare. The light control device of the present disclosure is arranged to suppress such reflections.

Light control devices/glare mitigation devices for reflection/glare suppression have been previously proposed.

For example, in UK patent no. GB2607672B, there was proposed a light control device for glare mitigation. GB2607672B described a light control device having a serrated sunlight-receiving surface providing an array of angled surfaces that can be arranged to direct sunlight away from a particular area, for example away from the eye-box of a head-up display. In particular, each of the angled surfaces forms an interface between a material forming the serrated surface and air such that most of the sunlight incident thereon (e.g. 96% of incident sunlight) is reflected (i.e. not coupled into the light control device/component). The angled surfaces are orientated at an angle with respect to a plane of the light control device. The angled surfaces are arranged to direct the reflected sunlight away from a direction towards the eye-box, owing to the orientation angle thereof. It was also described in GB2607672B how, in examples, the angled surfaces of the sunlight-receiving surface change the angle of reflection of sunlight incident thereon. That is, the angle of rays of sunlight received by the angled surfaces is different from the angle of rays of the sunlight reflected by the angled surfaces, where the angles of the rays of sunlight are measured with respect to (the normal to) the plane of the light control film/optical component in the first and second dimensions. It may be said that each angled surface changes the course or path of specular reflection of incident sunlight in comparison to specular reflection by non-angled surfaces (parallel to a plane of the light control component).

There was proposed an improvement to this light control device in UK patent application publication no. GB2303536. GB2303536 discloses a reflection suppression device comprising a first layer, an intermediate layer and a second layer. The first layer comprises a first serrated surface arranged to receive a holographic wavefront from a waveguide and provide a first turn of the holographic wavefront having at least a component on a first plane containing a surface normal of the waveguide. The first layer is formed of a transparent material. The intermediate layer is arranged to receive the holographic wavefront from the first layer, wherein the intermediate layer comprises a plurality of louvres in an array. Each louvre comprises a light absorbing material. The second layer is arranged to receive the holographic wavefront from the intermediate layer. The second layer comprises a second serrated surface arranged to provide a second turn of the holographic wavefront having at least a component on the first plane. The component of the second turn on the first plane is equal and opposite to the component of the first turn on the first plane. In GB2303536, the second (top) serrated surface of the reflection suppression device may perform as the serrated sunlight-receiving surface of GB2607672B and so is arranged to deflect sunlight. The second serrated surface may be provided as an array of prisms, the prisms forming the serrated sunlight-receiving surface. The inventors recognised that such a prismatic layer introduced a (second) turn component on the first plane and so there is a need to correct for deviations of the holographic wavefront (in at least the first plane) to compensate for the changes introduced by the turn. Thus, the first (bottom) serrated surface of the reflection suppression device was introduced, having serrations (e.g. an array of prisms) arranged to cancel out the (second) turn component on the first plane with a (first) turn.

These reflection suppression devices may be referred to as "in-filled" reflection suppression devices. That is, the louvres are separated and joined by a transparent material through which the display light (i.e. the light emitted by the optical component on an optical path to the user) may travel. The transparent material strengthens the reflection suppression devices by providing a solid base to which the often long, thin and potentially fragile louvres can be inserted, mounted, attached, etc. It has previously been the accepted opinion within the field of holographics that "in-filled" reflection suppression devices are the only practical option because of the need for thin structures that do not disrupt the angular "channels" of the holographic wavefront. Furthermore, any deformation of the louvres could result in worsening displayed image quality and a reduction in the reflection suppression function. In applications such as those in the automotive industry, the louvres may undergo large vibrational forces that may cause damage, resulting in the user potentially experiencing glare from the optical component. Furthermore, the "in-filled" reflection suppression devices provide additional benefits such as easier cleaning/ maintenance, as the solid structure of the transparent material may help prevent dust and debris from reaching the optical component.

Alternatively, an "air-spaced" reflection suppression device is possible and provides its own benefits. By "air-spaced", it is meant that the louvres are not supported by a transparent material. In other words, the display light can pass through an "air-spaced" reflection suppression device travelling only through air and not any other material. The reflection suppression device of the present disclosure comprises a plurality of air-spaced louvres. More specifically, there is disclosure herein optimised light channels of an air-spaced type reflection suppression component for waveguide HUD.

Summary of Optimisation of the Air-Spaced Light Channels

A first aspect of the present disclosure is a head-up display. The head-up display may be for a vehicle. The head-up display comprises an optical component described above. That is, the optical component comprises a surface arranged, during head-up display operation, in a configuration that is conducive to sunlight glare. The head-up display further comprises a reflection suppression device arranged to receive sunlight on an optical path to the surface (as also described above). The reflection suppression device comprises a lattice structure. The lattice structure may be an air-spaced structure. The lattice structure extends in a first direction and a second direction. It may be said that the first and second directions are parallel to one another. The lattice structure forms a plurality of channels extending in a third direction. That is, these channels are the passageways, gaps or openings between the walls/sides of the lattice structure to allow display/image light to pass therethrough (i.e., through each lattice element of the lattice structure, as described above). It may be said that the third direction is perpendicular to the first and second directions. In this case, it may be said that the channels extend substantially in the third direction. That is, it may be said that the channels extend primarily in the third direction, but not exactly parallel to the third direction, as will be further described below. That is, each channel extends away from a plane containing the first and second directions. Each channel is defined by a respective axis (in other words, a channel direction). That is, each channel extends (substantially) along a respective axis. As will be described below, the walls/sides of each channel may be non-parallel—in such cases the axis of the channel may be seen as an average of the directions of extension of the walls/sides of the channel away from a plane containing the first and second directions. Each (channel) axis has a first angle (in other words, slant) in the first direction and second angle (in other words, slant) in the second direction. That is, each (channel) axis has components of its extension in both the first and second directions. The first angle is a function of the first direction. That is, the first angle of each (channel) axis varies across the lattice structure in the first direction, the value of the first angle of each (channel) axis being dependent on the position of said axis across the lattice structure in the first direction.

The changing channel axis across the lattice structure allows the channels to be more accurately aligned to the "gut ray" emitted from each point across the surface of the optical component. As described above, the "gut ray" is the ray that passes from a defined centre of a display device of the heads-up display (such as device suitable for displaying a hologram that is illuminated to form the display light) and a defined centre of a viewing window of the head-up display, via the optical component. Thus, by better aligning the channels of the lattice structure with the "gut ray" across the surface of the optical component, less display light emitted from the surface will be in an optical path that is blocked by the walls/sides of each channel. As such, less display is blocked by the lattice structure, reducing the intensity loss caused by the lattice structure and decreasing the presence of optical artefacts visible to the user.

The second angle may be a function of the second direction. That is, the second angle of each (channel) axis may vary across the lattice structure in the second direction, the value of the second angle of each (channel) axis being dependent on the position of said axis across the lattice structure in the second direction. In this way, each channel may be better aligned to the "gut ray" emitted from across the surface of the optical component across the full area of said surface.

The lattice structure may comprise a first end and a second end in the first direction. The first angle of a channel at the first end may be in the range of 0° to 55°, such as 15° to 35°, and the first angle of a channel at the second end may be in the range of 5° to 75°, such as 25° to 45°. The lattice structure may comprise a first side and a second side in the second direction. The second angle of a channel at the first side may be in the range of 0° to 20°, such as 5° to 15°, and the second angle of a channel at the second side may be in the range of 5° to 35°, such as 15° to 30°. That is, these may be the range of angles of the channels across the lattice structure.

In many embodiments, the first angle increases with distance in the first direction, for example, from being in the range 25 to 30 degrees on one side (e.g., the first side) to being in the range 25 to 45 degrees on the other side (e.g., the second side). In many embodiments, the first angle increases with distance in the first direction from a value on one side (e.g., the first side) to a value on the other side (e.g., the second side) being at least 3 degrees greater than the value on the one side, e.g., at least 5 degrees greater, or at least 10 degrees greater.

In many embodiments, the second angle increases with distance in the second dimension, for example, from being in the range 5 to 15 degrees on one side (e.g., a first side thereof) to 15 to 30 degrees on the other side (e.g., a second side thereof). In many embodiments, the second angle increases with distance in the second direction from a value on one side (e.g., a first side thereof) to a value on the other side (e.g., a second side thereof) being at least 3 degrees greater than the value on the one side, e.g., at least 5 degrees greater, or at least 10 degrees greater.

The head-up display may have (in other words, form) a field of view defined by a first dimension and a second (perpendicular) dimension. The first direction may correspond to the first dimension and the second direction may correspond to the second dimension. This may be as described above.

The lattice structure may be (substantially) parallel to (a plane of) the surface of the optical component. That is, the lattice structure may be substantially parallel to the surface of the optical component (or a plane of it) in that it may be as close to parallel as possible within manufacturing constraints. As such, the inventors have found a method of producing a lattice structure that provides the optical benefits described above, without the need for the curvature of the entire lattice structure (as associated with the sixth aspect). This method is described below. The absence of such a curvature puts less strain on the lattice structure, improving its mechanical performance. Furthermore, a (substantially) planar (i.e., flat) lattice structure is easier to mount within a head-up display, and has a smaller volume, improving the packaging of the components within the head-up display.

It may alternatively be said that the structure comprises a lattice (e.g. honeycomb) in cross section that extends diagonally from a cross-sectional plane (e.g. x-y plane) to form a plurality of (open) channels each defined by an axis (e.g. channel direction) having a first (angle) component and second (angle) component, wherein the first component is a function of position within the lattice. The first component may be a first angle (with a surface normal of the cross sectional plane) on a first plane (e.g. y-z plane) perpendicular to the cross sectional plane and second component is a second angle (with a surface normal of the cross sectional plane) on a second plane (e.g. x-z plane) perpendicular to the cross sectional plane, wherein the first plane and second plane are orthogonal (to each other), wherein the first angle varies (e.g. gradually increases) as a function of position (e.g. in the y-direction).

A second aspect of the present disclosure is a method of processing an elongate member to form a lattice member. The lattice member may be formed part of the lattice structures described above. The elongate member may be referred to as a strip that is formed into a folded strip. That is, the elongate member may be described as a thin and narrow sheet of material, the longest dimension of which being defined as the length of said elongate member. The lattice member comprises an alternating array of front and back walls adjoined by side walls. That is, along the length of each lattice member, there is the repeating pattern of a front wall, a side wall, a back wall, a side wall, then another front wall, and so on. It may be said that the front and back walls generally fall into first and second layers, respectively. These layers are arranged with one on top of the other, and may be parallel or near parallel—that is, the layers may have a slight angular difference, as will be discussed further below. It may be said that the front walls are all on the same plane, whilst the back walls are all on the same plane (but a different plane to that of the front walls). These walls define an array of channels (i.e., open channels), as described above. The method comprises folding (i.e., bending) the elongate member at each fold line of a plurality of fold lines. These fold lines may be straight. It may be said that the fold lines traverse (the length of) the elongate member. That is, along the length of the elongate member there are arranged a series of fold lines. The direction of fold associated with each successive fold alternates with each successive fold. In other words, the elongate member is folded between the first and second layers. It may therefore be said that the alternate direction of fold forms the elongate member into a corrugated shape. The folds are such that each adjacent pair of fold lines defines a wall (be that a front, back or side wall—i.e., in the repeating pattern described above). An angle of the fold line on the elongate member changes (at least, as will be described further below) every other fold line along the elongate member. The angle of the fold line may be taken on a plane of the elongate member and from an axis perpendicular to the length of the elongate member. This change in angle is such that a first internal (wall) angle of each channel changes with distance along the lattice member. This first internal (wall) angle of the channel may correspond to the first or second angles described above in relation to the eighth aspect. This first internal (wall angle) of the channel may be the relative angles of adjacent side walls. The change in angle of the fold lines (and subsequent change in first internal wall angles) along the lattice member may be said to be progressive. It may also be said that the change in angle of the fold lines along the lattice member is such that the walls of the lattice member have a trapezoidal shape.

In this way, the inventors have devised a method by which the angle of the walls of each lattice member (and therefore the angle of each channel) can vary across the length of said lattice member (and as such, across the lattice structure). Importantly, the method is suitable for mass manufacture and is compatible with existing technology. By simply altering the angles of a series of fold lines along the length of an elongate member, the inventors realised that wall angles could be individually tuned across the length of the lattice member without needing to introduce a curvature to the member. This manufacturing process can offer more flexibility on how the variation in angles is applied to the structure. That is, the process allows for custom interior (wall) angles at each point across a lattice structure made using these lattice elements.

An angle of the fold line on the elongate member may (progressively) change every fold line along the elongate member. That is, rather than every other fold line, the angle changes with every subsequent fold line (with respect to the previous fold line). This may be such that a second internal (wall) angle of each channel (progressively) changes with distance along the lattice member. That is, whilst changing the angle of every other fold line results in a variation of the first or second angle (as described above in relation to the eighth aspect), changing the angle of every fold line results in a variation in both the first and second angles across a lattice structure formed of the lattice elements. This second internal (wall) angle of the channel may be relative angles of the front and back walls. As such, the full optical properties (of aligning the channels with the "gut ray") can be achieved without the need for curvature of the structure.

The distance between each fold line from the subsequent fold line may alternate between a first length and a second length. These lengths may be taken in a direction parallel to the length of the elongate member. The fold lines separated by the first distance may define the side walls and the fold lines separated by the second distance may define the front and back walls (alternately). As such, and with the aspect ratios of the lattice elements described above in mind, it may be said that the second distance is longer than the first distance.

A change in angle between an adjacent pair of fold lines separated by the first distance (that is, between a pair of fold lines that define a side wall) may be in the range of 0° to 0.03°, such as 0.01° to 0.015°. A change in angle between an adjacent pair of fold lines separated by the second distance (that is, between a pair of fold lines that define a front or back wall) may be in the range of 0° to 0.3°, such as 0.1° to 0.2°.

The magnitude of each fold may be substantially 90°. By magnitude, it is meant the angle about the fold line the elongate member is folded or bent. "Substantially 90°" refers to the idea that, as described above, the closer to a rectangular shape each lattice element has, the better the optical properties. However, exactly 90° may not be possible due to, for example, manufacturing constraints. As such, "substantially 90°" refers to the angle being as close to 90° as practically possible.

The folding may be achieved using die stamping. However, any other suitable manufacturing process may be used. That is, the change in fold angles may be achieved by the shape of the vertical surfaces of a die stamp and/or by a wedge applied to the front faces of the die stamp. Die stamping may provide a good tolerance and level of control over the process.

Another aspect of the present disclosure is a method of manufacturing a lattice structure for a reflection suppression device for a head-up display. This lattice structure may be as described above. The method comprises forming a plurality of lattice members using the method described above. The method further comprises attaching the front wall of a lattice member to the back wall of a subsequent lattice member. In other words, the plurality of lattice members are combined to formed the lattice structure. In this way, a lattice structure as described above (especially with regards to the eighth aspect) can be manufactured.

The lattice members may be attached such that the side walls of each lattice member are substantially aligned with the side walls of the adjacent lattice members. As such, it may be said that the side walls of adjacent lattice members together form a side wall of the respective channel (as described above). The lattice members may be attached such that the lattice structure is substantially planar. This may result in an uneven (or overlapped) attachment of the front and back walls of adjacent lattice members.

Each lattice member may be substantially the same. This simplifies the manufacturing process and is only possible because the varying angles between channels can be built up with the compounding angles of each successive fold line on each lattice member. The lattice members may be attached to one another using (spot) welding. However, any other suitable manufacturing process may be used, so long as it produces the strength of connection required without adversely thickening the front/back walls to worsen the optical properties of the lattice structure.

In other words, a method of manufacturing a reflection suppression device for a head-up display (for a vehicle) is provided. The reflection suppression device comprises a lattice structure formed from a plurality of elongate members. The lattice structure forms a plurality of channels, each channel comprising a front wall and opposing back wall and a pair of opposing side walls. The method comprises a first step of bending (i.e., folding) an elongate member out of (i.e., away from) a first plane of the elongate member. The method further comprises a second step of bending (i.e., folding) the elongate member in the opposite direction to the first step to form a second plane of the elongate member to form a portion of a first side wall. The method further comprises a third step of bending (i.e., folding) the elongate member out of (i.e., away from) the second plane in the opposite direction to the second step to form a front wall. The method further comprises a fourth step of bending (i.e., folding) the elongate member back towards the first plane of the elongate member (in the opposite direction to the third step) to form a portion of a second side wall. The method further comprises a fifth step of repeating the first four steps along the length of the elongate member to form back walls between the bend (i.e., fold) created in the fourth step of an iteration (i.e., a first iteration) and the bend (i.e., fold) created in the first step of the next (i.e., subsequent or second) iteration. The method further comprises a sixth step of repeating the first five steps to shape (i.e., form) a plurality of elongate members. The method further comprises a seventh step of attaching the front walls of a first elongate member to corresponding front walls of an adjacent second elongate member (such that the portions of side walls formed in the second and fourth steps combine to form a plurality of side walls). The method further comprises an eighth step of attaching the back walls of the second elongate member to corresponding back walls of a further adjacent third elongate member (such that the portions of side walls formed in the second and fourth steps combine to form a plurality of side walls). The method finally comprises a ninth step of repeating the seventh and eighth steps to form the lattice structure. The bends (i.e., folds) in the first four steps are such that the shape of at least one of the front walls, back walls or side walls is trapezoidal. The first four steps, or even the first five steps, may occur concurrently.

These aspects of the present disclosure may be combined with any one or more of the other individual or discrete features summarised in the following section even when those features are only described in combinations.

Summary of Other Features of the Structure and Method of Manufacture

The head-up display has (or, forms) a viewing window (for example, an eye-box). Throughout this application, a viewing window (in other words, a viewing area or volume or e.g. an eye-box) is a term used to refer to a continuous, area or volume in which the full field of view or image(s) is fully visible to a sufficiently high quality. The head-up display comprises an optical component (as described above). The optical component comprising a surface arranged (e.g. orientated), during head-up display operation, in a configuration that is conducive to sunlight glare. That is, the surface of the optical component is positioned, whilst the head-up display is in use, in a position and/or orientation that may result in sunlight being reflected from the surface to the viewing window or eye-box. This reflection from the surface to the user may be direct or indirect, e.g. may be via another optical component such as an optical combiner (for example, the windscreen of a vehicle) or may involve multiple reflections within the structure of the head-up display. In some embodiments, the surface of the optical component is reflective (to sunlight). The surface may be (substantially) flat—that is, sufficiently flat that the above-described glare can occur on at least some optical paths determined by the geometry of the surface. The optical component may be a pupil expander or a replicator, or a waveguide, but any optical component of the head-up display having a substantially flat or smooth surface that could cause sunlight glare could benefit from the present disclosure. The head-up display further comprises a reflection suppression device (as described above, and, in other words, glare mitigation device or more broadly a light control layer) arranged to receive sunlight on an optical path to the surface. That is, the reflection suppression device is arranged such that the sunlight is intercepted (or blocked or altered) by the reflection suppression device before it reaches the surface of the optical component, or after the sunlight has been reflected or emitted from the surface. As such, "on an optical path to the surface" does not necessarily mean that the optical path in this description is being followed in the direction the sunlight travels on the optical path or reduces sunlight (i.e. glare) from reaching the user. The reflection suppression device may absorb or diffuse the sunlight. It may be said that the reflection suppression device is arranged in cooperation (e.g. optical cooperation) with the optical component (in some embodiments, one is adjacent to or fixed to the other).

The reflection suppression device comprises a lattice structure. The lattice structure comprises a plurality of lattice elements extending from the surface of the optical component. That is, an array (which may be regular or irregular) of lattice elements (or, in other words, cells) are arranged (and affixed to one another) such that they collectively form a lattice structure. A lattice structure comprises a regular array of walls (e.g. parallel and perpendicular walls) defining a regular array of cavities or gaps or channels. The lattice structure may be substantially planar and/or may comprise a pair of planar surfaces defining a top and bottom. In embodiments, a planar bottom surface forms a light input face and an opposing, planar top surface forms a light output face. Each cavity or channel of the lattice structure is formed by a plurality of walls. The channels may be substantially identical in size and shape. In some embodiments, at least one internal angle of the channels varies across the lattice structure. Each lattice element has a first pair of opposing parallel first sides (or walls) and a second pair of opposing parallel second sides (or walls). That is, the lattice elements are each formed, at least in part, by two pairs of parallel sides—in other words, walls). In some embodiments, the first sides are longer than the second sides.

In some embodiments, the first pair of sides may act as the louvres described above (i.e. they reduce/block glare from reaching the viewing window or eye-box) whilst the second pair of sides may strengthen the lattice structure such that it is strong enough to withstand the forces exerted upon it. It has been found that, whilst introducing the second pair of sides can provide sufficient strength to the lattice structure, too much material (i.e. too small a lattice element) may block too much of the display light passing through the surface of the optical component. Notably, it was realised that a delicate balance between mechanical factors and optical factors must be struck. For example, if this balance is not struck, the lattice structure may result in undesirable artefacts being visible in the image viewed by the user. On the other hand, increasing the size of the lattice elements permits more sunlight that might reach the viewing window or eye-box from the surface of the optical component.

Notably, it was found that the delicate balance between the conflicting mechanical and optical factors was different in the first direction (e.g. horizontal direction) to the second direction (e.g. vertical direction). Through extensive simulation and experimentation, it was found that periodicity of the lattice structure in the second direction should be largely driven by optical factors but the periodicity of the lattice structure in the first direction should be largely driven by mechanical factors. Accordingly, it was found that a lattice structure in which the first sides (of the first pair) were longer than the second sides (of the second pair) could be optimal for glare mitigation of a head-up display for automotive application-however, this feature is not essential to the present disclosure.

There is disclosed herein a structure providing crossing linking between the first sides with the second sides, in which the stiffness to protect the spacing of the sides is significantly increased, such that the lattice structure becomes self-supporting e.g. without the need for tension to maintain spacing). Notably, this solution provides a simple geometry solution without the need for tension across the slats (which may cause deformation issues). Furthermore, the strengthening provided by the second sides provides a lattice structure that is robust to thermal effects and direct user contact/handling.

An aspect ratio of at least one of the lattice elements may be substantially equal to or greater than an aspect ratio of an image to be displayed. It has been found that the size and proportions of the lattice elements can be optimised based on the size and proportions of the image displayed.

The long dimension of each lattice element may correspond to a long dimension of the display image. For example, the display image may be "landscape" and so the first side or wall of each lattice element may be longer than the corresponding second side or wall. In some embodiments, it has been found that, providing the aspect ratio of each lattice element is at least equal to that of the virtual image perceived from the eye-box, the lattice structure disclosed herein was effective from an optical and mechanical perspective.

The head-up display may be said to have a field of view defined by a first dimension (e.g. horizontal angular range) and second dimension (e.g. vertical angular size), the first dimension being greater than the second dimension. The first sides of at least one of the lattice elements of the reflection suppression device may extend in a first direction corresponding to the first dimension. As is described further below, the first sides extending in a direction corresponding to the longer dimension of the field of view ensures the preservation of the key angles of display light emitted from the surface of the optical component.

At least one of the lattice elements may further comprise a third pair of opposing parallel third sides, the third sides being substantially the same length as the second sides. Each second side may be arranged at an angle relative to the respective third side, the angle being in the range of 60° to 180°, such as 80° to 120°. At least one of the lattice elements may have an elongate or linearly-stretched hexagonal shape. In this way, the second and third sides share the burden of strengthening of the lattice structure, which can be optimal in some cases.

Alternatively, each first side may be arranged substantially perpendicularly to each adjacent second side. At least one of the lattice elements may be substantially rectangular in shape. As will be further discussed below, the inventors have found that in some cases that using a rectangular shape further reduces the artefacts visible in the displayed image.

At least one lattice element may extend from the surface of the optical component in a direction substantially parallel to a guy ray emitted from the surface. In this way, the sides of the lattice structure may be considered walls. As further described below, the "gut ray" is the ray of light that travels from a defined centre of the displayed device to a defined centre of the eye-box via the optical component and reflection suppression device. In other words, the "gut ray" is used to define an average (compound) angle at which the light is emitted from the surface of the optical component. Thus, the angles of light emitted from the surface of the optical component that can pass through the lattice structure are maximised.

The walls of the lattice structure make an angle with the surface normal. The lattice elements may extend from the surface of the optical component at a first angle in the range of 0° to 65°, such as 20° to 40° (taken on a first plane containing the surface normal or in a first direction). The lattice elements may extend away from the surface of the optical component at a second angle in the range of 0° to 25°, such as 10° to 25°, the second angle taken in a perpendicular direction than the first angle (i.e. taken on a second, perpendicular plane containing the surface normal or a second, perpendicular direction). In configurations using an optical combiner (e.g. a windscreen), the first angle may be taken on a plane normal to both the surface of the optical component and the viewing window, whilst the second angle may be taken on a plane normal to the surface of the optical component and parallel to the viewing window.

A ratio of the length of the first sides compared to the length of the second sides may be in the range of 2:1 to 50:1, such as 3:1 to 10:1.

Each lattice element may have substantially the same shape and/or size. Thus, mass manufacturing of the lattice structure is made easier and the regular array provides balanced mechanical (i.e. strength) qualities across the structure.

Each of the first sides may have a first end and a second end. A plurality of the first sides may have an upper section, a lower section and a central section extending between the first end and the second end. The central section may be arranged between the upper and lower sections (in the direction of the extension of the first sides from the surface of the optical component). The central section may have the combined width of the upper and lower sections. That is, the upper and lower sections may have thinner (i.e. cut-away) portions than the central, thicker, section. In this way, more angles of light may be able to pass through the lattice structure (by not being blocked by the thinner portions of the first sides), whilst the central portion provides the strengthening effect.

A method of manufacturing a reflection suppression device for a head-up display (as described above) is provided. The method comprises forming a plurality of elongate members (in other words, sheets or strips, e.g. thin sheets or strips, of material). Each member comprises a plurality of first portions, a plurality of second portions and plurality of connecting portions. The first and second portions (of each elongate member) are arranged alternately along the length of each member (i.e. the longest direction in which the member extends). A connecting portion arranged between each first and second portion. That is, each member alternates, in a repeating fashion, between a first portion, a connecting member, a second portion and then another connecting member. The first portions of each member are arranged on a first plane and the second portions of the member are arranged on a second plane, the first and second planes being parallel and spatially separated from one another. That is, each member alternates between first portions on the first plane and second portions on the second plane, the portions joined by the connecting portions that cross back and forth between the two planes. These members may be formed by bending a planar strip of material into the desired shape. The method further compromises forming a plurality of lattice elements by alternately attaching the first portions of an elongate member to corresponding first portions of an adjacent elongate member and attaching the second portions of the adjacent elongate member to corresponding second portions of a further adjacent elongate member. That is, the members are attached "back-to-back" with the adjacent members. In this way, the lattice members as described above can be formed, with the first and second portions forming the first sides of the lattice elements (and as such acting as the louvres) and the connecting portions forming the second (and third) sides.

The head-up display has (in other words, forms) a field of view (e.g., an angular field of view) defined by a first dimension (e.g., horizontal angular field of view) and second dimension (e.g., vertical angular field of view). In other words, the head-up display emits light at a range of angles that is viewable to the user at the viewing window (as described above), forming a field of view with first and second dimensions. It may be said that the first and second dimensions are perpendicular. The first and second dimensions may also be used to define the size of an image formed in the field of view. The head-up display comprises an optical component (which may be as described above), such as a planar waveguide. The optical component comprises a surface arranged, during head-up display operation, in a configuration that is conducive to sunlight glare, as also described above. The head-up display further comprises a reflection suppression device arranged to receive sunlight on an optical path to the surface (as described above). In accordance with this disclosure, the reflection suppression device comprises a lattice structure. The lattice structure comprises a first array of first walls extending in a first direction corresponding to the first dimension. In some embodiments, the first direction has a major component parallel to the first dimension. That is, in these embodiments, the first walls extend at least predominantly parallel to the first dimension.

The lattice structure further comprises a second array of second walls extending in the second direction corresponding to the second dimension. That is, when reflected off an optical combiner (such as the windscreen of a vehicle), the second direction would appear to the user as following (or being the same as) the second dimension. The first and second arrays of first and second walls form an array of lattice cells or "elements". As discussed further below, the first walls may be referred to as louvres (and are equivalent to the first sides described above), whilst the second walls may be referred to as strengthening members (and are equivalent to the second and third sides described above). The first walls may be parallel to each other and the second walls may be parallel to each other. The first dimension is greater than the second dimension. In other words, a size of the field of view in the first dimension is greater than a size of the field of view in the second dimension. That is, it may be said that the field of view is landscape, as viewed by the user. A first periodicity of the first walls is higher than a second periodicity of the second walls. In other words, a first period of the first walls is lower than a second period of the second walls. That is, the first walls are each separated by a constant first distance and the second walls are each separated by a constant second distance, the second distance being longer than the first distance. In other words, the first and second walls are regularly arranged in their respective arrays, with the second walls arranged with greater spacing therebetween in comparison to the first walls.

In some embodiments, an optical turn or "global turn" of the display light is performed after the optical component. The global turn may be defined by a first angle on a first plane containing a surface normal of the optical component (e.g., the waveguide) and a second angle on a second plane containing a surface normal, wherein the first plane and second plane are orthogonal. In other words, the global turn may be a compound turn defined by two angles. In these embodiments, the lattice structure may be rotated in accordance with the global turn of the display light. In embodiments, a plane of the optical component and a plane of the lattice structure are substantially parallel. This rotation may be a rotation of the lattice structure on the plane thereof. This rotation angles the lattice cells or "elements" of the lattice structure relative to the field of view. In some embodiments, the field of view (and/or the image displayed therein) and lattice elements of the lattice structure are both rectangular (i.e. have a long side and a short side). In some embodiments-such as those comprising a global turn—there may therefore be an angle between the major (e.g. longest) dimension of the field of view (or displayed image) and the major (e.g. longest) dimension of the lattice elements of the structure. Alternatively, it may be said that there is an angle between the major (e.g. longest) dimension of the field of view (or displayed image) and the first direction of the first walls. Likewise, there is angle between the minor (e.g. shortest) dimension of the field of view (or displayed image) and the short sides of the lattice elements of the lattice structure. Alternatively, it be the said that there is an angle between the minor (e.g. shortest) dimension of the field of view (or displayed image) and the second direction of the second walls. Whilst these embodiments create a non-parallelism between the field of view (or displayed image) and lattice elements, there is still an optical correspondence between the major/minor dimension of the field of view (or displayed image) and major/minor dimension of the lattice structure. The term "walls extending in a first/second direction corresponding to the first/second dimension" therefore encompasses an arrangement in which the first/second direction is non-parallel with the first/second dimension of the field of view (and/or displayed image) owing to a rotation of the lattice structure on its plane to accommodate a global turn of the display light, for example.

In this way, a strengthened "air-spaced" louvre design is provided, bringing with it the benefits as described above. In some embodiments, the design is such that the lattice elements are at least substantially rectangular (i.e. as close to a rectangular shape as is possible within the manufacturing constraints). In these embodiments, the rectangular shape is arranged in a substantially landscape orientation (as would be viewed by the user via an optical combiner), as a result of the second (vertical, as seen by the user) walls being spaced further apart than the first (horizontal) walls. As described above, it has been found that the delicate balance between optical and mechanical factors could be struck differently in the two orthogonal directions.

Furthermore, by using a substantially rectangular structure (as opposed to the elongated hexagonal structure as described above), less light is blocked from travelling through the lattice structure. That is, due to the internal angles of an elongated hexagonal structure (i.e. the angles of the second and third sides as described above), more light will be blocked as it travels through the lattice structure. This effectively increases the thickness of the strengthening walls (in other words, the strengthening members or sides) of the lattice elements to the distance between the ends of the angled second or third sides in the first direction. Thus, by using second walls that are substantially perpendicular to the first walls, the effective thickness of these second walls is reduced to the thickness of the second walls themselves, and thus less light is blocked. This results in fewer optical artefacts in the field of view being visible to the user.

Adjacent first walls may be adjoined (in other words, joined) in the second direction such that the second walls are twice the thickness of the first walls. That is, contrary to some embodiments of the lattice structure and method of manufacture thereof described above, the walls may be joined such that the double thickness region/portion is in the second direction rather than the first direction. A region of double thickness is necessary in some part of the lattice structure, in order to securely affix the first and second walls (to provide the necessary strengthening function). However, it was realised the further improvement of ensuring that the double thickness region is in the second direction. As described above, the range of angles that can pass through the lattice structure are more important to be preserved in the first direction than in the second direction, and so having the double thickness region in the second direction blocks angles of light in the second direction rather than in the first direction. Furthermore, due to the periodicities described above, is a greater surface area of the surface of the optical component covered by the first walls than the second walls, and therefore less light is blocked by doubling the thickness of the second walls. This structure is achieved by the method described below.

In other words, the lattice (in other words, mesh or cell) structure was orientated such that the single wall elements are aligned with the horizontal dimension of the field of view and the double wall portions are aligned parallel to the vertical dimension of the field of view. This enables the high frequency lattice element pitch (in the field of view horizontal dimension, performing the function of the louvres to block veiling glare) to have the minimum wall thickness and therefore minimise thickness of the lines obstructing an image displayed in the field of view where the most walls are present. This increases the intensity of the light displayed and minimises visible lines or other optical artefacts. The double thickness portion is then aligned with the vertical dimension of the field of view, with the double thickness portions performing the mechanical structure function and not a veiling glare suppression function. These will therefore be significantly fewer and so are less detrimental to the light emitted therefrom if thicker.

The first walls may be joined by the second walls in an alternating pattern. The second walls may be each joined to a pair of first walls at a plurality of joining points. The joining points at which a first wall is joined with a subsequent first wall in the first array may be arranged equidistant between the joining points at which the first wall is joined with a prior first wall in the first array. In other words, the lattice structures may be formed (i.e. arranged) in a repeating pattern between alternate first walls.

The first and second dimensions may be the horizontal and vertical directions respectively, as viewed from the viewing window.

The first walls may extend away from the surface of the optical component at an angle (i.e. a first angle) relative to the surface in the range of 0° to 65°, such as 20° to 40°. This angle may be taken on a (first) plane perpendicular to the surface of the optical component and to the first direction. In this way, the first walls (acting as louvres) are angled to accommodate for the angle perpendicular to the first and second dimensions at which image light is emitted from the optical component. This angle (referred to as the orientation angle) may be intentionally chosen in order to compensate for the curvature of the optical combiner via which the image light is reflected to arrive at the user.

The second walls may extend away from the surface of the optical component at an angle (i.e. a second angle) relative to the surface in the range of 0° to 25°, such as 10° to 25°. This angle may be taken on a (second) plane perpendicular to the surface of the optical component and to the second direction. In this way, the second walls are angled to accommodate for the angle parallel to the second dimension at which image light is emitted from the optical component. This angle may be intentionally chosen in order to compensate for the curvature of the optical combiner and to ensure that the viewing window is located in the optimal position for the best viewing experience.

The first direction may be at an angle relative to the first dimension in the range of 0° to 45°, such as 20° to 35°. As such, there is provided an alternative way of accommodating for the angle (taken on a plane parallel to the second dimension and perpendicular to the first direction) at which the image light is emitted from the optical component.

The first direction may be substantially parallel to the first dimension. That is, as close to parallel as possible within the manufacturing constraints.

A method of manufacturing a reflection suppression device for a head-up display is provided. The reflection suppression device and head-up display may be as described above. The method comprises forming a stack from a plurality of sheets of material (in other words, and more simply, forming a stack of sheets). The stack is formed by attaching each sheet to the adjacent sheets in a striped pattern. The striped pattern consists of alternating portions of joined and free regions of each sheet. That is, if (for example) adjacent sheets are attached via an adhesive, each sheet may have adhesive applied in a series of parallel regions forming the striped pattern. In other words, the striped pattern is any pattern that forms the lattice structure as described below. Each sheet of material extends on a plane having a first direction and a second, perpendicular direction. It may be said that each sheet is arranged parallel, and as such the sheets all share the same first and second directions. The method further comprises cutting (each sheet of) the stack on a cutting plane at a first angle with respect to the first direction to create a lattice structure. In other words, the stack is cut at an angle to form a (collapsed) lattice structure, where each lattice element is formed due to the joining of adjacent sheets in the striped pattern. It may be said that the cutting of the stack involved cutting through each sheet of the stack. The method further comprises expanding the lattice structure in a direction normal to the plane of the sheets of material to form a plurality of lattice elements. That is, the (collapsed) lattice structure formed by the cutting step is expanded to form the lattice elements. The lattice elements may be as described above. The expansion is such that at least one of the lattice elements is substantially rectangular in shape. In other words, the expansion is greater than an expansion to form lattice elements having a substantially hexagonal shape. That is, the continued expansion causes two pairs of adjacent sides of the hexagon shape (the sides formed from the regions of the sheets not joined in the joining step) to become parallel, this forming the substantially rectangular shape.

That is, it was surprisingly discovered that the desired substantially rectangular shape described above can be achieved by expanding the lattice structure past the point traditionally reached. In other embodiments, it is standard practice to expand the lattice structure until the lattice elements are substantially hexagonal in shape and to stop the expansion at that point. It is only because of the unique application to head-up displays, as described above, that the inventors have realised that the expansion can continue to arrive at the desired structure.

Furthermore, cutting the stack at an angle results in the lattice elements extending at an angle relative to a plane of the lattice structure. In this way, the lattice elements can be manufactured to be angled to best accommodate the light passing therethrough. Thus, a lattice structure can be manufactured providing the advantages and benefits described above.

In other words, cutting an expanded lattice array to the desired size and angle would result in deformed edges and burrs due to the edges of the lattice elements being unsupported (or difficult to support). Such deformed edges and burrs could compromise the performance of the lattice elements where a thin edge is critical. As such, the present disclosure uses a method in which the compressed stack of laminated layers is cut at the desired lattice element angle prior to expanding the lattice structure. In the compressed (or collapsed) state, the adjacent sheets support each other during the cutting process. Therefore, the thin edges can be supported while the cutting forces are applied. The cut, expanded sheets forming the lattice structure can then be orientated against the cut face, resulting in the walls of the lattice elements being angled as described above and as required for the reflection suppression operation. The outside perimeter can then be cut as required for footprint, orientation and shape of the reflection suppression device.

The cutting plane may be perpendicular to the plane of the sheets of material. In this case, the resultant lattice elements (i.e. the first walls, as described above) will extend from the surface of the optical component (as described above) in a first angle (taken on a plane perpendicular to both the surface of the optical component and the viewing window).

The cutting plane may be at a second angle with respect to a normal of the plane of the sheets of material. The second angle may be in the range of 0° to 25°, such as 10° to 25°. In this case, the resultant lattice elements (i.e. the second walls, as described above) will also extend from the surface of the optical component (as described above) in a second angle (taken on a plane perpendicular to the surface of the optical component and parallel to the viewing window). The second angle of this method corresponds to (in other words, contributes to) the second angle of the lattice elements as described above. That is, the relationship between the second angle of this method and the second angle of the lattice elements may not be 1-to-1. This additional angle of cut enables all walls of the lattice element to be aligned with the "gut ray", further reducing the quantity of display light that will be blocked by the reflection suppression structure.

The expansion may be such that each of the lattice elements is substantially rectangular in shape. This provides the benefits and advantages of such a shape as described above.

The first angle may be in the range of 0° to 65°, such as 20° to 40°. The first angle of this method corresponds to (in other words, contributes to) the first angle of the lattice elements as described above. That is, the relationship between the first angle of this method and the first angle of the lattice elements may not be 1-to-1.

The attachment of the adjacent sheets of material may alternate between a first striped pattern and a second striped pattern. The alternating pattern results in the alternating arrangement of lattice elements formed between adjacent first walls as described above.

The stack of sheets of material may have a first sheet and a last sheet. The step of expanding the lattice structure may comprise apply tension to the first sheet relative to the last sheet. The connection of the joined portions of the adjacent sheets diffuses the tension on the first and last sheet throughout the sheets, such that each lattice element is expanded equally and at the same time.

A method of manufacturing a head-up display device is provided. The head-up display device may be as described above. The method comprises manufacturing a reflection suppression device using the above described method. The method further comprises affixing the reflection suppression device to an optical component. The optical component and the relationship between the reflection suppression device and the optical component may be as described above.

A head-up display is provided. As described above, the head-up display has (or, in other words, forms) a viewing window and may be for a vehicle. The head-up display comprises an optical component comprising a surface arranged, during head-up display operation, in a configuration that is conducive to sunlight glare, as described above. The head-up display further comprises a reflection suppression device arranged to receive sunlight on an optical path to the surface as also described above. The reflection suppression device comprises an air-spaced lattice structure. That is, as described above, the lattice structure does not contain a transparent material to support the lattice structure. In other words, light passing through the lattice structure can do so entirely whilst travelling through air. The lattice structure comprises a first curvature (in other words, the lattice structure is curved or arched) about a first axis parallel to the surface of the reflection suppression device.

The display light of a head-up device is emitted from the surface of the optical component at a range of angles that vary across the surface. In an ideal world, the curvature of the lattice structure would be such that it exactly matches the angles of light emitted from surface at each point on the surface, to ensure that minimal light was blocked by the lattice structure as it passed therethrough. However, this be prohibitively complex and expensive to manufacture. As such, the inventors have surprisingly discovered that the majority of effect of minimising the blocked light can be achieved with a simple, single curvature of the lattice structure. As such, by introducing a curvature about the surface of the reflection suppression device, the openings in the lattice structure (i.e. the walls that form the lattice elements) can be more accurately aligned to the "gut ray" emitted from each point across the surface. As described above, the "gut ray" is the ray that passes from a defined centre of a display device of the heads-up display (such as device suitable for displaying a hologram that is illuminated to form the display light) and a defined centre of the viewing window, via the optical component. Thus, by better aligning the walls of the lattice elements with the "gut ray" across the surface of the optical component, less display light emitted from the surface will be in an optical path that is blocked by the walls. As such, less display is blocked by the lattice structure, reducing the intensity loss caused by the lattice structure and decreasing the presence of optical artefacts visible to the user.

In other words, the present disclosure forms each lattice element into a shape such that each lattice element of the lattice structure is broadly optimised to the local range of angles needed from each region of the optical component to deliver the full field of view to the viewing window. In its extreme, lattice structure would be formed to a freeform shape. That is, in a fully optimised system, the orientation of the walls of each lattice element of the lattice structure would be locally optimised to the local ray bundle specific to that region of the optical component. This would result in the full lattice structure exit face having a freeform surface.

This can be simplified down to a cylindrical surface (i.e. a single plane/extrusion of curvature). This is the simplest and most practical surface to implement, as it would only require the lattice structure to be formed in a single direction. Bending the mesh in a single direction about the first axis lends itself well to the above described "substantially rectangular" structure of the lattice elements, as the staggered second walls can be deformed in a single direction. Whilst forming the lattice structure into a cylindrical form is not fully optimal, the inventors have surprisingly discovered that it gives a substantial improvement for minimal additional manufacturing effort.

The head-up display may have a field of view defined by a first dimension and second dimension, the first dimension being greater than the second dimension, as described above. The first axis may correspond to (in other words, is parallel to) the first dimension. The inventors have discovered that the primary change in angles emitted over the surface of the optical component is in a direction corresponding to the second dimension (the second direction, as described above). As such, the first curvature is about an axis that corresponds to the first dimension (the first dimension being perpendicular to the second dimension).

The lattice structure may comprise a plurality of first walls (acting as louvres) extending in a first direction corresponding to the first dimension, as described above. The first curvature may be such that each first wall is arranged at a different angle relative to a plane of the surface of the optical component compared to the neighbouring first walls. The lattice structure may comprise a first end and a second end (that is, the ends of the lattice structure the furthest distance from the first axis). A first wall at the first end may be arranged at an angle relative to the plane of the surface of the optical component in the range of 0° to 55°, such as 15° to 35°, and a first wall at the second end may be arranged at an angle relative to the plane in the range of 5° to 75°, such as 25° to 45°. That is, the angles of the first walls (i.e. the louvres) change from one end of the lattice structure to the other because of the first curvature. This change may be in the range of 5° to 10°.

The first curvature may be symmetrical about a central axis of the surface of the optical component, the central axis corresponding (in other words, being parallel to) to the first dimension. It may be said that this is such that the angles of adjacent first walls relative to a plane of the surface of the optical component have a linear difference or change from the first end to the second end of the lattice structure (i.e. about the central axis).

The lattice structure may be parallel to a second axis, the second axis being parallel to the surface of the optical component and perpendicular to the first axis. That is, the curvature may be cylindrical in nature. In other words, the exit face of the lattice structure is formed as a spherical surface to substantially optimise for angles of display light emitted from the surface of the optical component in both the first and second dimensions.

The lattice structure may comprise a second curvature about a second axis parallel to the surface of the optical component and perpendicular to the first axis. That is, the total curvature may be spherical in nature. The inventors have recognised that further optical benefits can be achieved by curving the lattice structure in a second direction. This further improves the optical properties described above without a large increase in manufacturing complexity.

The lattice structure may comprise a plurality of second walls (acting to strengthen the louvres/first walls, as described above) extending in a second direction corresponding to the second dimension, as described above. The second curvature may be such that each second wall is arranged at a different angle relative to a plane of the surface of the optical component compared to the neighbouring second walls. The lattice structure may comprise a first edge and a second edge (that is, the edges of the lattice structure the furthest distance from the second axis and perpendicular to the first and second ends). A second wall at the first edge may be arranged at an angle relative to the plane of the surface of the optical component in the range of 0° to 15°, such as 5° to 20°, and a second wall at the second edge may be arranged at an angle relative to the plane in the range of 5° to 35°, such as 15° to 30°. That is, the angles of the second walls (i.e. the strengthening members) change from one edge (in other words, one side) of the lattice structure to the other because of the second curvature. This change may be in the range of 5° to 10°.

The curvature of the lattice structure may correspond to the change in angle at which light is emitted from across the surface of the optical component. That is, as discussed above the curvature may be adapted to minimise the quantity of display light blocked by the lattice structure. The curvature of the lattice structure may correspond to the curvature of an optical combiner (for example the windscreen of a vehicle) arranged downstream from the reflection suppression device on an optical path from the optical component to the viewing window. The varying angles of the display light emitted from the optical component across the surface of said component may at least in part be due to complex curvature of the optical combiner from which the display is reflected to arrive at the viewing window. As such, modifying the curvature of the lattice structure based on the curvature of the optical combiner further reduces the quantity of blocked display light.

The curvature of the lattice structure may correspond to the angles of display light required at each point of the viewing window.

A head-up display is provided which, as described above, may be for a vehicle. The head-up display has (in other words, forms) a viewing window, as described above. The head-up display comprises an optical component comprising a surface arranged, during head-up display operation, in a configuration that is conducive to sunlight glare, as is described above. The head-up display further comprises a reflection suppression device arranged to receive sunlight on an optical path to the surface. The reflection suppression device may be any of the reflection suppression devices described above. The reflection suppression device has a first edge (in other words, a first end or side). The reflection suppression device is arranged such that lateral movement relative to the surface of the optical component is restricted (in other words, prevented). That is, the reflection suppression device cannot (substantially) move laterally relative to the optical component. The reflection suppression device is further arranged such that the reflection suppression device can rotate (in other words, pivot) relative to the surface about the first edge. In other words, the head-up display further comprises a fixing means arranged to restrict or reduce lateral movement of the reflection suppression device relative to the surface of the optical component whilst allowing the reflection suppression component to rotate relative to the surface about the first edge.

Fine "air-spaced" louvres, as described above, over optical component has practical implications. One key consideration is how to clean the walls of the lattice elements and the optical surface beneath that is exposed to the dust, dirt and fluids of the surrounding environment (such as a vehicle cabin). One solution could be to make the reflection suppression device removable, which would enable simple cleaning of both the lattice elements and the surface of the optical component beneath it. However, this approach pose safety risks as it may allow the user to drive the vehicle without the reflection suppression device in place and may allow the reflection suppression device to detach during a vehicle crash scenario.

Therefore, rather than being able to fully remove the reflection suppression device, it could be retained by means of a pivot or hinge along the first edge (which may be the "car forward" edge). This would enable the user to lift it so that both sides of the lattice elements could be accessed for cleaning along with the surface of the optical component. This is a solution to a problem that unique exists in reflection suppression devices with "air-spaced" louvres. The retained axis of the present disclosure also ensures secure anchoring of the reflection suppression device in the event of a vehicle crash to prevent movement of the component during such an event.

The reflection suppression device may secured relative to the surface of the optical component by a hinge. In other words, the fixing means is a hinge. By retaining the reflection suppression device with a hinge, it could not be removed, thus preventing it from being lost and substantially reducing the risk of the vehicle being driven without it in place.

The reflection suppression device may further have a second edge substantially perpendicular to the first edge, the first edge being longer than the second edge.

The reflection suppression device may further have a third edge substantially parallel to the first edge, the first edge being arranged further from a user than the third edge. In other words, the third edge may be arranged between a user and the first edge.

The rotation of the reflection suppression device about the first edge may have a maximum range relative to the surface of the optical component of 90°. This may be due to contact between the third edge of the reflection suppression structure and the windscreen (more broadly, an optical combiner) of the vehicle. In other words, the proximity and rake of the windscreen would prevent the reflection suppression device being lifted to or beyond 90°. The reflection suppression device would therefore automatically return to the correct horizontal position when the user lets go-thus ensuring it is in the correct position for use when driving the vehicle.

The reflection suppression device may be further arranged such that the rotation relative to the surface (of the optical component) about the first edge is selectively restricted. That is, there may be a locking mechanism that holds the reflection suppression device in place to prevent rotation when the vehicle is in use.

Summary of Terminology

In the present disclosure, the term "replica" is merely used to reflect that spatially modulated light is divided such that a complex light field is directed along a plurality of different optical paths. The word "replica" is used to refer to each occurrence or instance of the complex light field after a replication event-such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances-providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present disclosure is not restricted to the embodiments described in the following but extends to the full scope of the appended claims. That is, the present disclosure may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
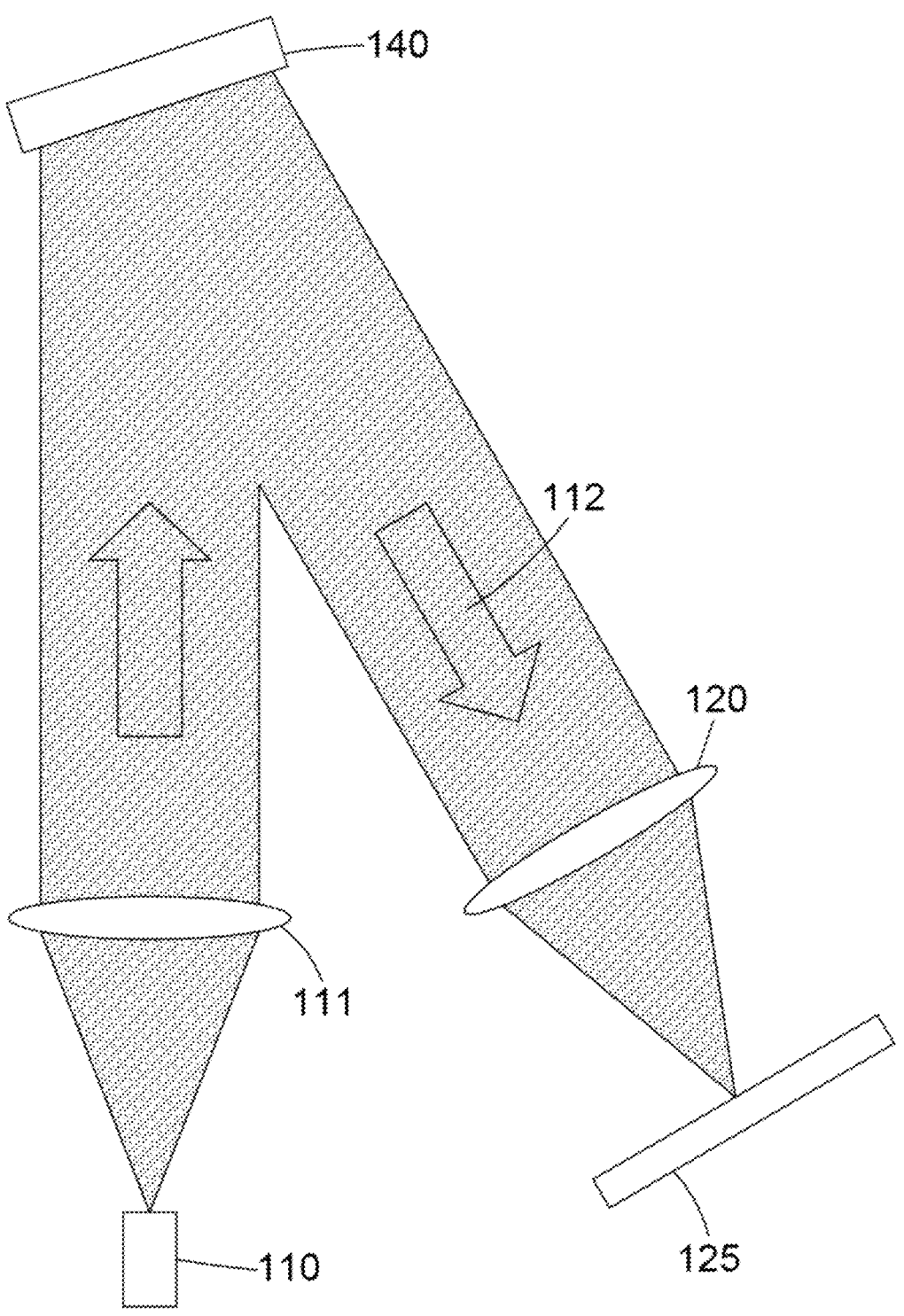
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. United Kingdom patent application publication no. 2603517, which is hereby incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. United Kingdom patent application publication no. 2610203, which is hereby incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. United Kingdom patent application publication no. 2614286, which is hereby incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Field of View Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one-such as, at least two-orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments-described only by way of example of a diffracted or holographic light field in accordance with this disclosure-a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channelling

The hologram formed in accordance with some embodiments, angularly-divides the image content to provide a plurality of hologram channels which may have a cross-sectional shape defined by an aperture of the optical system. The hologram is calculated to provide this channelling of the diffracted light field. In some embodiments, this is achieved during hologram calculation by considering an aperture (virtual or real) of the optical system, as described above.

Figure 2:
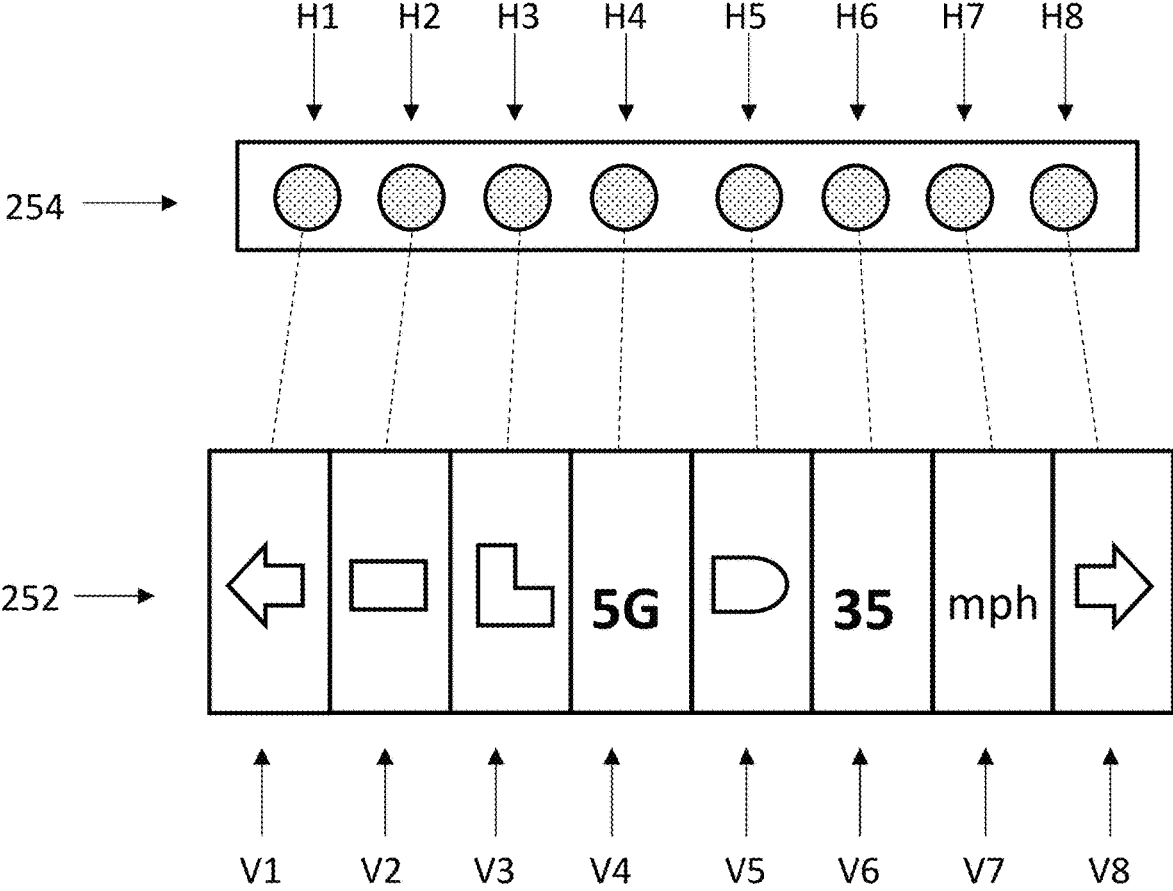
FIG. 2 shows an image for projection comprising eight image areas/components, V1 to V8, and cross-sections of the corresponding hologram channels, H1-H8.
Figure 3:
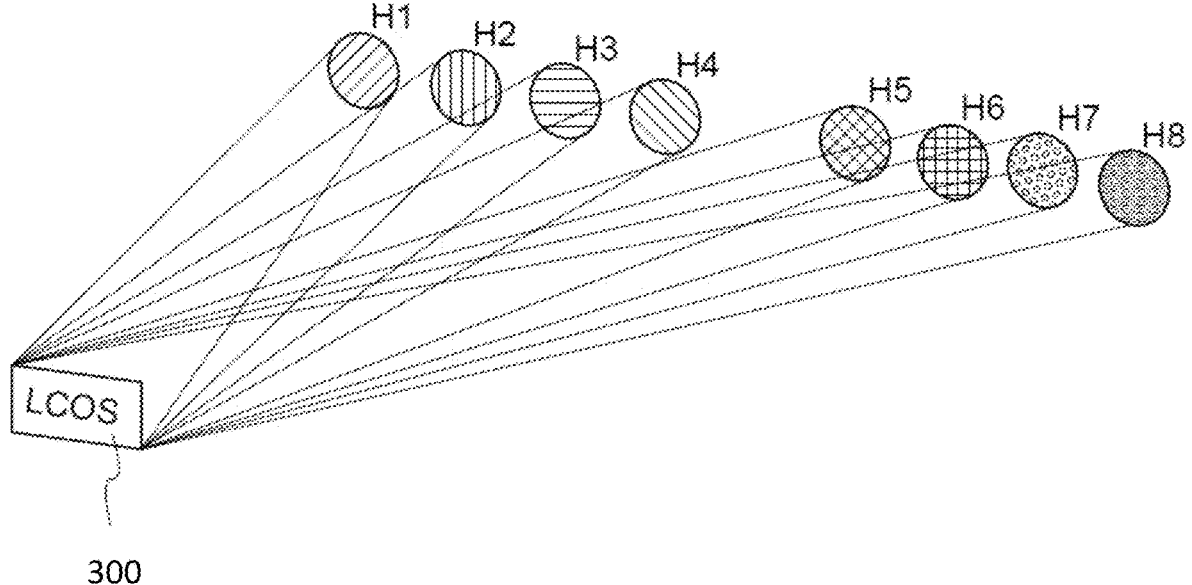
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
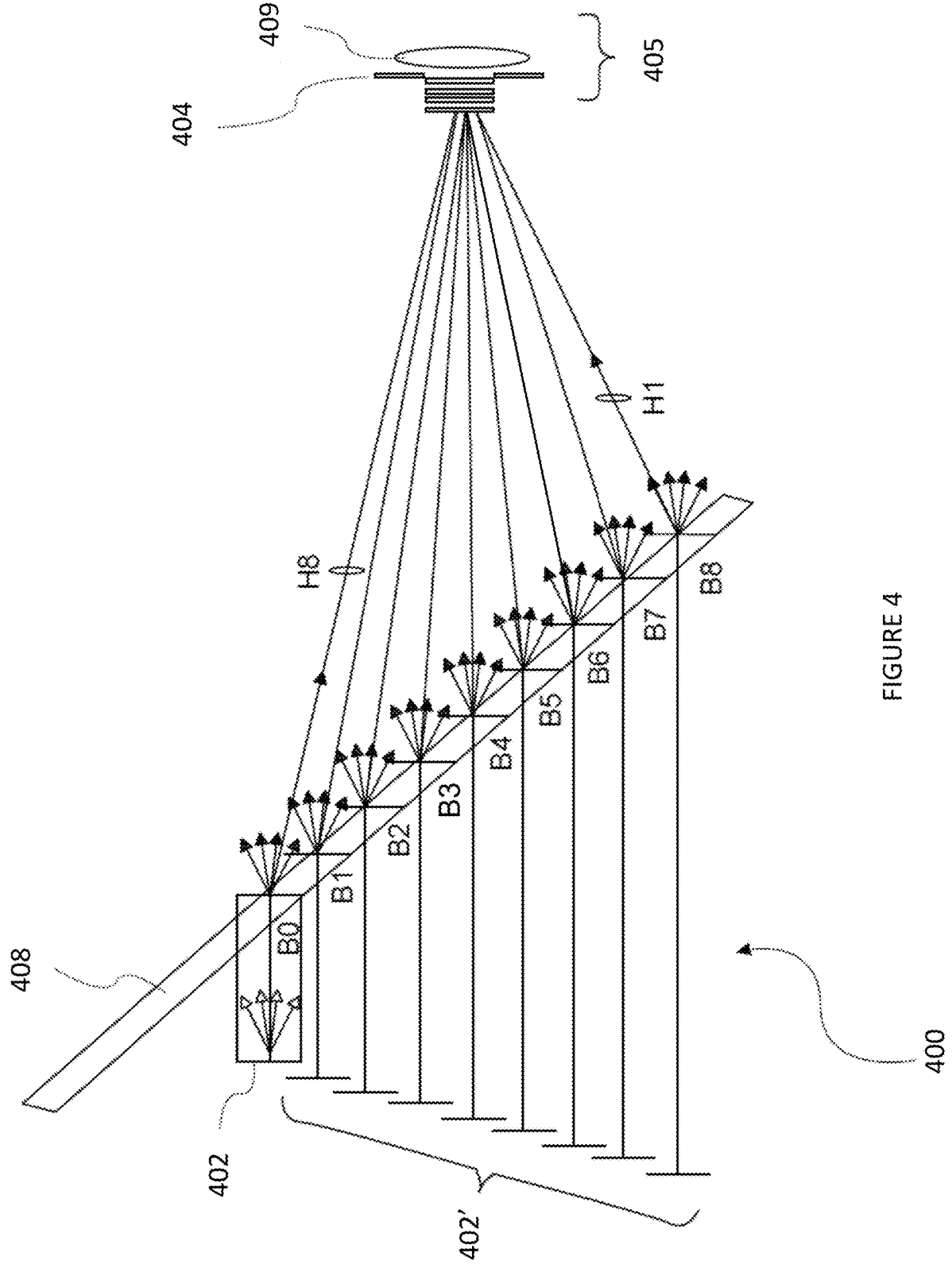
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The waveguide 408 forms a plurality of replicas of the hologram, at the respective "bounce" points B1 to B8 along its length, corresponding to the direction of pupil expansion. As shown in FIG. 5, the plurality of replicas may be extrapolated back, in a straight line, to a corresponding plurality of replica or virtual display devices 402'. This process corresponds to the step of "unfolding" an optical path within the waveguide, so that a light ray of a replica is extrapolated back to a "virtual surface" without internal reflection within the waveguide. Thus, the light of the expanded exit pupil may be considered to originate from a virtual surface (also called an "extended modulator" herein) comprising the display device 402 and the replica display devices 402'.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
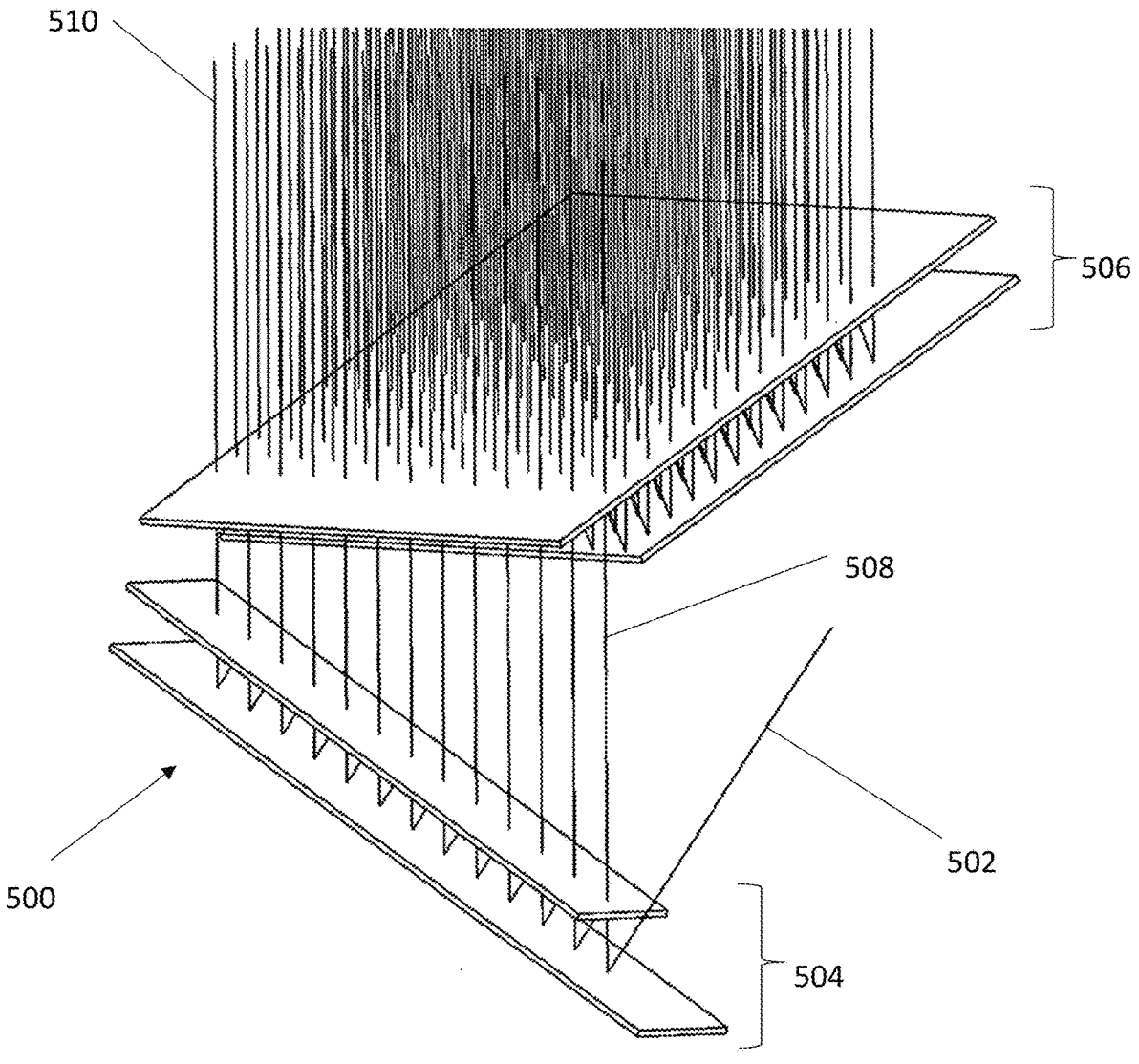
FIG. 5A shows a perspective view of a first example two-dimensional pupil expander comprising two replicators each comprising pairs of stacked surfaces.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflective surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
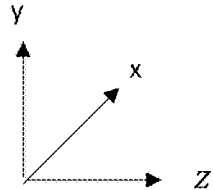
FIG. 5B shows a perspective view of a first example two-dimensional pupil expander comprising two replicators each in the form of a solid waveguide.

FIG. 5B shows a perspective view of a system 500 comprising two replicators, 520, 540 arranged for replicating a light beam 522 in two dimensions, in which the first replicator is a solid elongated waveguide 520 and the second replicator is a solid planar waveguide 540.

In the system of FIG. 5B, the first replicator/waveguide 520 is arranged so that its pair of elongate parallel reflective surfaces 524a, 524b are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light-comprising a one-dimensional array of replicas extending in the first dimension—from the output port/reflective-transmissive surface 524a of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524a of the first replicator 520 is adjacent the input port of the first replicator/waveguide 520 that receives input beam 522 at an angle to provide waveguiding and replica formation, along its length in the first dimension. Thus, the input port of first replicator/waveguide 520 is positioned at an input end thereof at the same surface as the reflective-transmissive surface 524a. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as the y dimension) is reduced. The mirror 530 is configured to direct the light away from a first layer/plane, in which the first replicator 520 is located (i.e. the "first planar layer"), and direct it towards a second layer/plane, located above and substantially parallel to the first layer/plane, in which the second replicator 540 is located (i.e. a "second planar layer"). Thus, the overall size or "height" of the system-comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device-such as a pixelated display device, for example a spatial light modulator (SLM) or Liquid Crystal on Silicon (LCoS) SLM-which is arranged to provide or form the diffracted or diverging light. In such aspects, the aperture of the spatial light modulator (SLM) is a limiting aperture of the system. That is, the aperture of the spatial light modulator-more specifically, the size of the area delimiting the array of light modulating pixels comprised within the SLM-determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field-including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent application publication no. 2936252, which is hereby incorporated herein by reference). The present disclosure is compatible with holograms that compensate for the complex curvature of an optical combiner used as part of the projection system. In some embodiments, the optical combiner is the windscreen of a vehicle. Full details of this approach are provided in European patent application publication no. 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channelling hologram to the viewer. The holographic projector may further comprise a control device arranged to control the delivery of angular channels to the eye-box position. United Kingdom patent application publication no. 2607899, which is hereby incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the delivery of hologram light channels, and their replicas, to the eye-box. Each aperture or window may comprise a plurality of liquid crystal cells or pixels.

Reflection Suppression to Mitigate Glare

In operation, the output (in other words, the transmission/exit) surface of the second replicator 540 of the two-dimensional pupil expander of FIG. 5B forms an external surface or "output port" from which image light is transmitted through air to an eye-box area for viewing. Accordingly, the output surface may be exposed to sunlight from the environment in which the head-up display is used. Received sunlight may cause glare to the viewer, in particular due to reflections of sunlight associated with the pupil expander 540 and/or a turning film, if used in conjunction with the pupil expander 540. For example, glare may arise if rays of sunlight are directly reflected from the external output surface, or other surfaces of the pupil expander 540, at angles such that rays of sunlight follow an optical path directly to the viewing window/eye-box. This is described herein as "direct glare". In another example, glare may arise if sunlight is coupled into the pupil expander 540 at angles such that rays of sunlight follow the same optical path within the pupil expander as rays of image light, or are otherwise reflected by surfaces thereof, in order to reach the viewing window/eye-box indirectly (e.g. via an optical combiner, such as a vehicle windscreen). This is described herein as "veiling glare".

Figure 6:
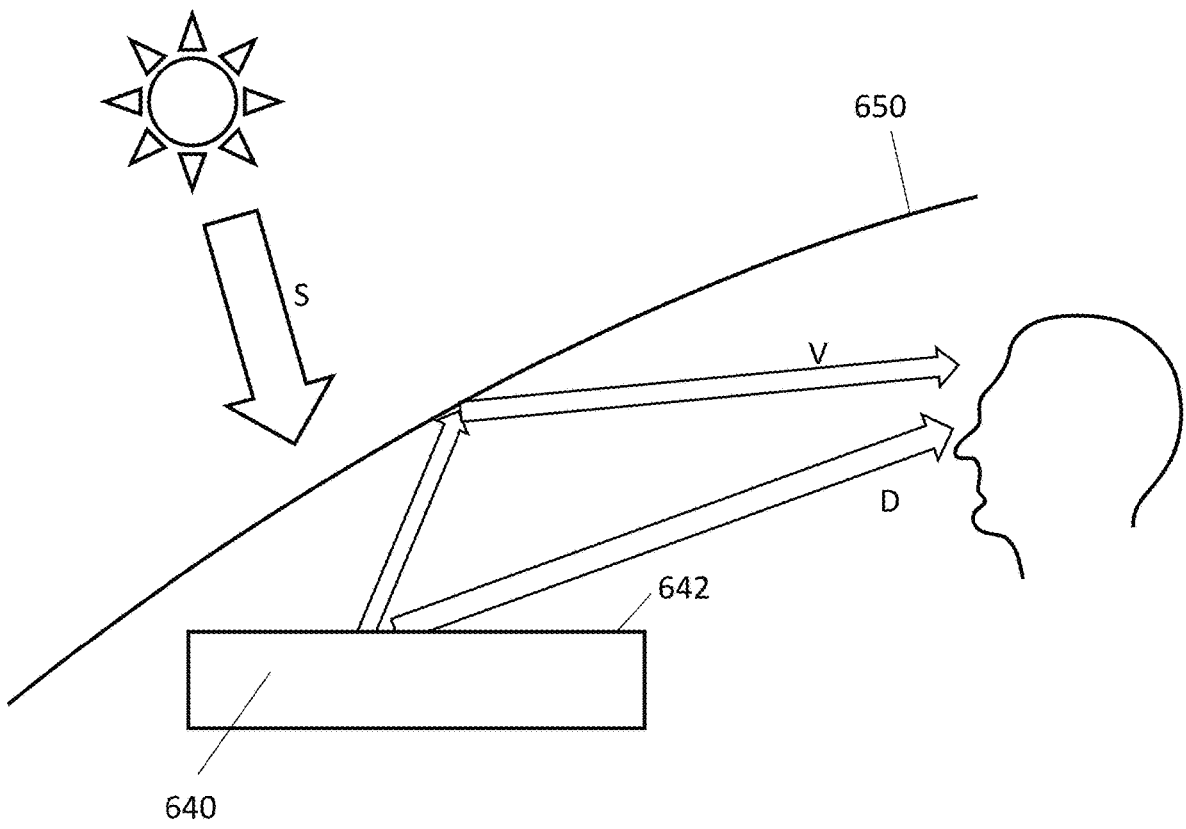
FIG. 6 is a schematic side view of an automotive head-up display system showing potential areas of sunlight glare.
Figure 6:
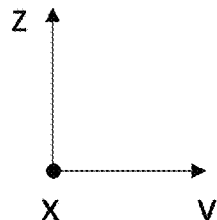

FIG. 6 shows the optical path of rays of sunlight S incident on the output surface 642 of a (bulk optic) waveguide pupil expander 640 of a head-up display (HUD) in an automotive application. In particular, sunlight S at a relatively high elevation angle to the horizon is incident through a vehicle windscreen 650 onto the external output surface 642 of the pupil expander 640. In the example, the output surface 642 is located in a substantially horizontal plane in an aperture in the vehicle dashboard (not shown). Some sunlight rays D may be directly reflected from the pupil expander 640 (e.g. by one or more reflective layers thereof) towards the viewing window/eye-box and cause "direct glare". Some other light rays V may be indirectly reflected from the pupil expander 640 (e.g. by one or more reflective layers thereof) towards the viewing window/eye box, via the windscreen 650 and cause "veiling glare". Thus, light rays V may follow the same optical path(s) as image light output from the pupil expander 640. In either case, the glare arising from reflected sunlight may be harmful to the viewer/driver.

Figure 7:
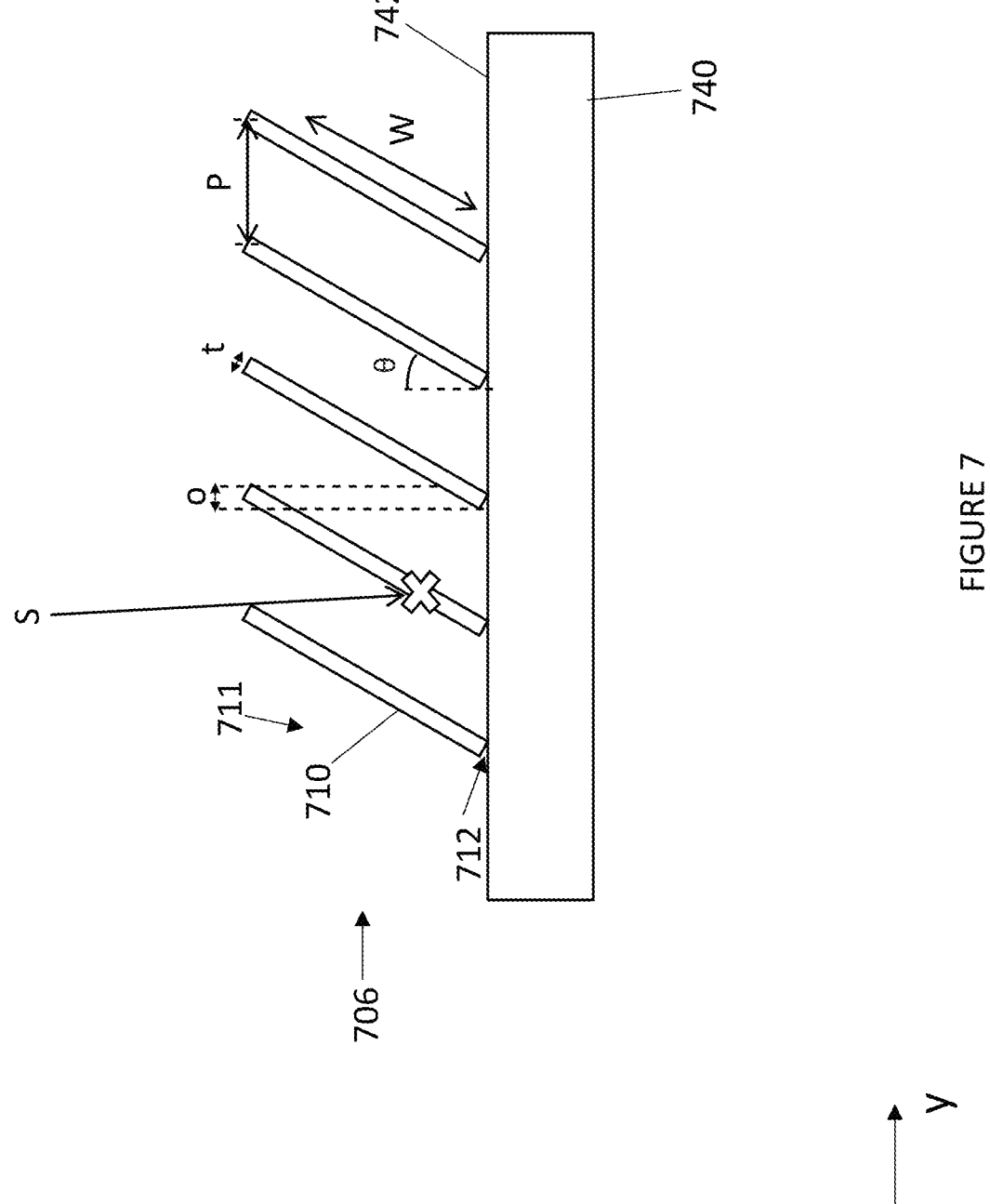
FIG. 7 is a schematic side view of a reflection suppression device formed on a transmission surface of a pupil expander of a display system showing incident sunlight from a first elevation angle.

FIG. 7 shows a light control layer comprising a louvre structure 706 in accordance with the prior art. The louvre structure 706 comprises a plurality of parallel louvres 710 arranged in a one-dimensional array on a substantially planar output surface 742 of a waveguide pupil expander 740. The array of louvres 710 is arranged in air such that there are no transparent structures between the louvres/louvre slats 710. As shown in FIG. 7, the output surface 742 lies in a plane in first and second orthogonal dimensions (illustrated as an x-y plane) and the louvres/louvre slats 710 are arranged in a one-dimensional array in the second dimension (illustrated as the y dimension). As the skilled person will appreciate, the pupil expander 740 performs pupil expansion, and thus forms replicas of image light (not shown) at the output surface 742, along a direction (illustrated from left to right) in the second dimension (illustrated as the y dimension). Thus, the light rays of the replicas of the image light may be output from the output surface 742 in the spaces between louvres/louvre slats 710 towards the viewing window/eye-box (not shown), as described with reference to FIG. 6.

Each louvre 710 of the louvre structure 706 comprises a longitudinal rectilinear louvre slat with parallel rectangular sidewalls (in cross section) defining a thickness t therebetween, which, in the illustrated arrangement, is a uniform thickness t. The sidewalls are rectangular and have a length (not shown), extending along the first dimension (illustrated as the x dimension), and a width w, extending at an inclination angle to a third dimension, orthogonal to the first and second dimensions (illustrated as the z dimension). Thus, the thickness t of the louvre slats extends in the second dimension (illustrated as the y dimension). The sidewalls of the louvres 710 are orientated at a non-orthogonal angle relative to the planar output surface 742, as illustrated by angle θ with respect to the surface normal of the transmission surface 742. In addition, the louvres/louvre slats have a louvre pitch p corresponding to the spacing or separation between adjacent louvres 710 in the second dimension (illustrated as the y dimension). In the illustrated arrangement, the louvre pitch p is uniform across the array, such that all pairs of adjacent louvre slats have the same spacing. In other examples, the louvre pitch p may vary, for instance according to position along the length of the transmission surface in the second dimension (illustrated as the y dimension).

The dimensions (e.g. thickness t and width w) and other parameters (e.g. orientation angle θ and pitch p) of the array of louvre slats 710 of the louvre structure 706 are chosen to mitigate the risk of sunlight glare (both direct glare and veiling glare).

The pitch p between the louvres, the orientation angle θ and/or the width w of the louvres 710 is selected such that there is an overlap (or overhang) between adjacent louvres (in the second dimension-illustrated as the y dimension). In particular, the distal end/edge 711—the end that is remote/distal with respect to the output surface 742—of one louvre overlaps (or overhangs) the proximal end/edge 712 of the adjacent/neighbouring louvre in the second dimension, as shown by overlap o. It may be said that the proximal end/edge 712 of one or a pair of neighbouring louvres/louvre slats 710 is in the shadow of the overlap (or overhang) o of the distal end/edge 711 of the other of the pair of neighbouring louvres/louvre slats 710. In consequence, rays of sunlight S received from the sun at high elevation angles (e.g. at very small/substantially normal angle of incidence to the transmission surface) cannot pass between the louvres/ louvre slat 710 so as to reach the transmission surface 742 and be specularly reflected therefrom. Rather, the optical path of the rays of sunlight S is blocked by one of the louvres 710 and so absorbed or attenuated as shown by the cross X.

Figure 8:
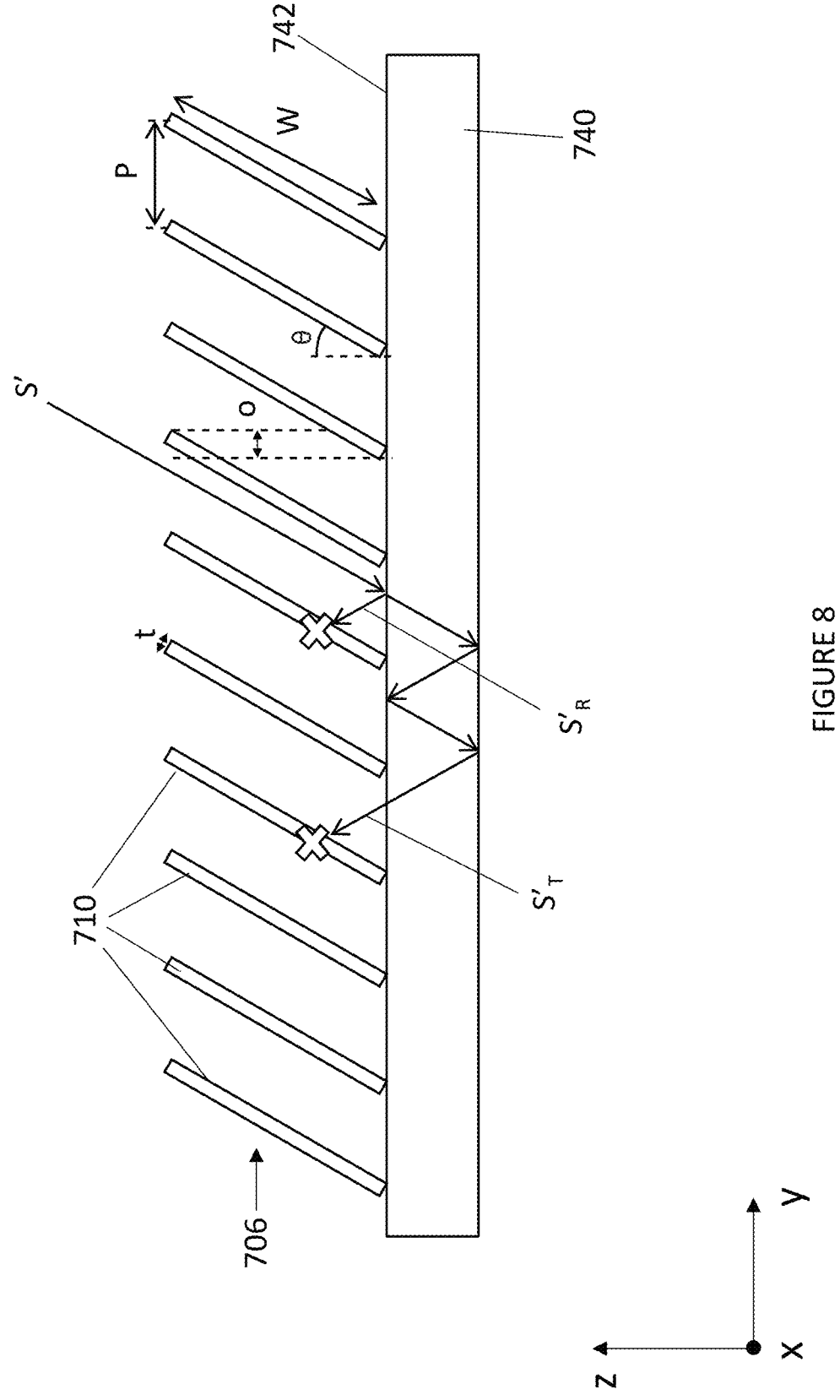
FIG. 8 is a schematic side view of the reflection suppression device of FIG. 7 with incident sunlight from a second elevation angle.

FIG. 8 shows the example of FIG. 7, in which the sunlight S' is received from the sun at a different/higher elevation angle. In this scenario, sunlight S' is received through the windscreen (not shown) at an angle that enables the light rays to pass between the louvres/louvre slats 710 (e.g. parallel to the sidewalls of the louvre slats 710) and so to be (directly) incident on the output surface 742 of the waveguide pupil expander 740. In this scenario, a proportion of the incident sunlight S' may be specularly reflected from the output surface 742 as reflected rays S'R. However, due to the parameters of the louvre structure 706, as described herein, the reflected rays S'R are specularly reflected along an optical path that is blocked by a louvre/louvre slat 710, and thus absorbed or attenuated as shown by cross X. Furthermore, the remaining proportion of incident sunlight S' may be transmitted through the output surface 742 into the waveguide pupil expander 740. In this case, as shown in FIG. 8, the light rays may be internally reflected between the opposed reflective surfaces of the waveguide 740 as shown by arrows (from right to left—the opposite direction to the direction of pupil expansion). At each internal reflection/ bounce at the partially reflective-partially output surface 742, some light rays are emitted from the output surface 742 as transmitted rays ST. However, once again, the transmitted rays S'T are emitted from the output surface 742 along an optical path that is blocked by a louvre/louvre slat 710, and thus also absorbed or attenuated as shown by cross X.

Accordingly, in accordance with the example of FIGS. 7 and 8, the optical path of rays of sunlight S, S' incident on the glare mitigation device comprising the louvre structure 706, at substantially all angles of elevation of the sun (from which light can pass through the windscreen), follow an optical path that is blocked, and thus absorbed or attenuated, by at least one of the louvres/louvre slats 710. Thus, the risk of sunlight being reflected towards the viewing area/eye-box and causing glare is reduced/mitigated.

Occlusions of Image Light

When disposed over an output port of a display system, such as an output surface of a waveguide pupil expander, the louvre structure may introduce occluded areas (or simply "occlusions") in the image light of the expanded exit pupil of the display system.

Figure 9:
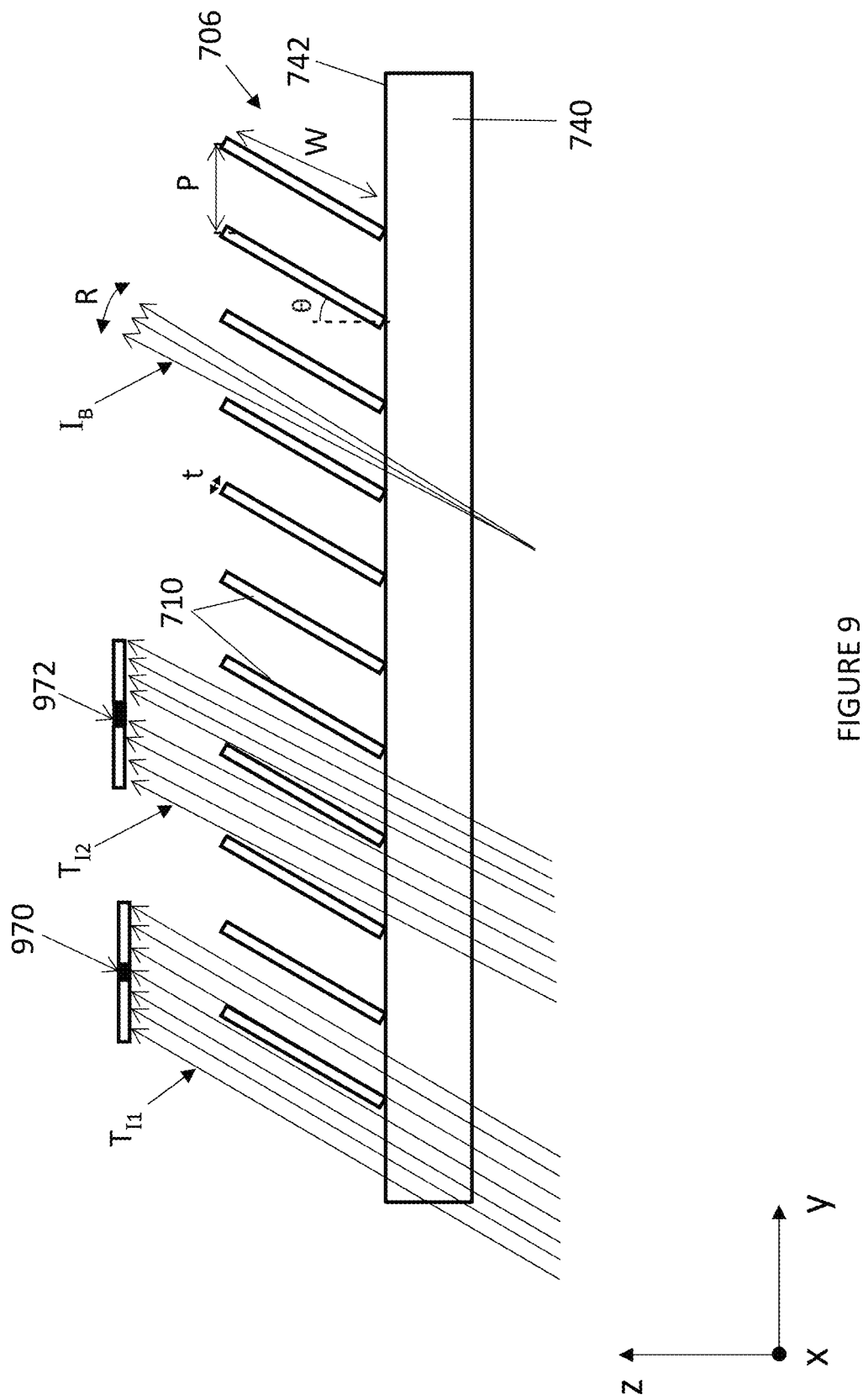
FIG. 9 is a schematic side view showing the occlusions that may be formed in the image light field output by a display system.

Referring to FIG. 9, the projection axis of the image light I output by the output surface 742 of the waveguide pupil expander 740 may be at substantially the same angle θ as the orientation of the louvres/louvre slats 710 relative to the surface normal of the output surface 742.

FIG. 9 shows a first set of parallel rays $T_{I1}$ of image light I emitted at the orientation angle θ of the louvres/louvre slats 710. The first set of rays $T_{I1}$ thus pass between the louvres 710, parallel to the sidewalls of the louvres/louvre slats 710 as shown by arrows, in the direction of the required optical path to the viewing window. However, some of these first set of rays $T_{I1}$ are blocked by the louvres/louvre slats 710, such as the proximal end/edges thereof. This leads to occluded areas/occlusions 970 in the projected image light where no image light is present.

In addition, the image light I may be a diffracted light field comprising diverging ray bundles, for example encoding a hologram comprising angular channels, as described herein. Thus, the light rays output between the louvres/louvre slats 710 may subtend a range of angles R about a general projection axis of the image light I and thus the orientation angle θ of the louvres/louvre slats 710, as shown by the example output diverging image ray bundle Is having a range of light ray angles R.

Accordingly, FIG. 9 shows a second set of rays $T_{I2}$ of image light I emitted at an example maximum angle from the plane parallel to orientation angle θ of the louvres/louvre slats 710. The light rays at the centre of the second set of rays $T_{I2}$ pass between the louvres 710, in a direction that is not parallel to the sidewalls of the louvres 710 as shown by arrows, in the direction of the required optical path to the viewing window. However, the light rays at the periphery of the second set of rays $T_{I2}$ are blocked by the distal end/edge of each of the louvres 710. This leads to occluded areas/occlusions 972 in the projected image light where no image light is present. Owing to the angle of the light rays of the second set of rays $T_{I2}$, the size of the occlusions 972 is slightly greater than the dimensions of the distal edge (end face) of the louvre slats 710, and thus the size of the occlusions 972 in the second dimension (illustrated as the y dimension) formed by the first set of rays $T_{I1}$.

The size of the occlusions 970 substantially corresponds to the dimensions of the proximal/distal edge (end face) of the louvre slats 710, and has the same length as the slat length in the first direction (illustrated as the x direction) and a width corresponding to the slat thickness t which extends generally in the second dimension (illustrated as the y dimension). Thus, the occlusions 970 of the first set of rays Th of image light I may be minimised by minimising the thickness t of the louvres/louvre slats 710. In examples, the thickness of the louvres/louvre slats may be less than 0.17 mm so that the occlusions 970 are not visible to the viewer at a viewing window/eye-box at approximately 1 m from the louvre structure. In some embodiments, the thickness is also greater than 5 μm so that diffraction is not caused.

As the skilled person will appreciate, the thickness t of the louvres/louvre slats 710 should be sufficient for the material thereof to perform the required absorption, attenuation, or diffuse scattering of sunlight to supress reflections, and so prevent glare, as described herein. Thus, the thickness t of the louvres/louvre slats 710 should be selected to balance the conflicting needs of (i) minimising the thickness to minimise occlusions in the emitted image light field, and (ii) providing a sufficient thickness to prevent sunlight glare, according to application requirements.

The occlusions 972 of the second set of rays $T_{I2}$ of image light I may be minimised by selecting the orientation angle θ of the louvres/louvre slats 710 at a median angle-midway between the maximum and minimum angles—of the range R of light rays of the light ray bundle of the image light I that is required to be propagated to the viewing area (e.g. according to the required field of view such as from −0.5° to)+0.5°.

Improved Reflection Suppression Device-First Example

Figures 10, 11:
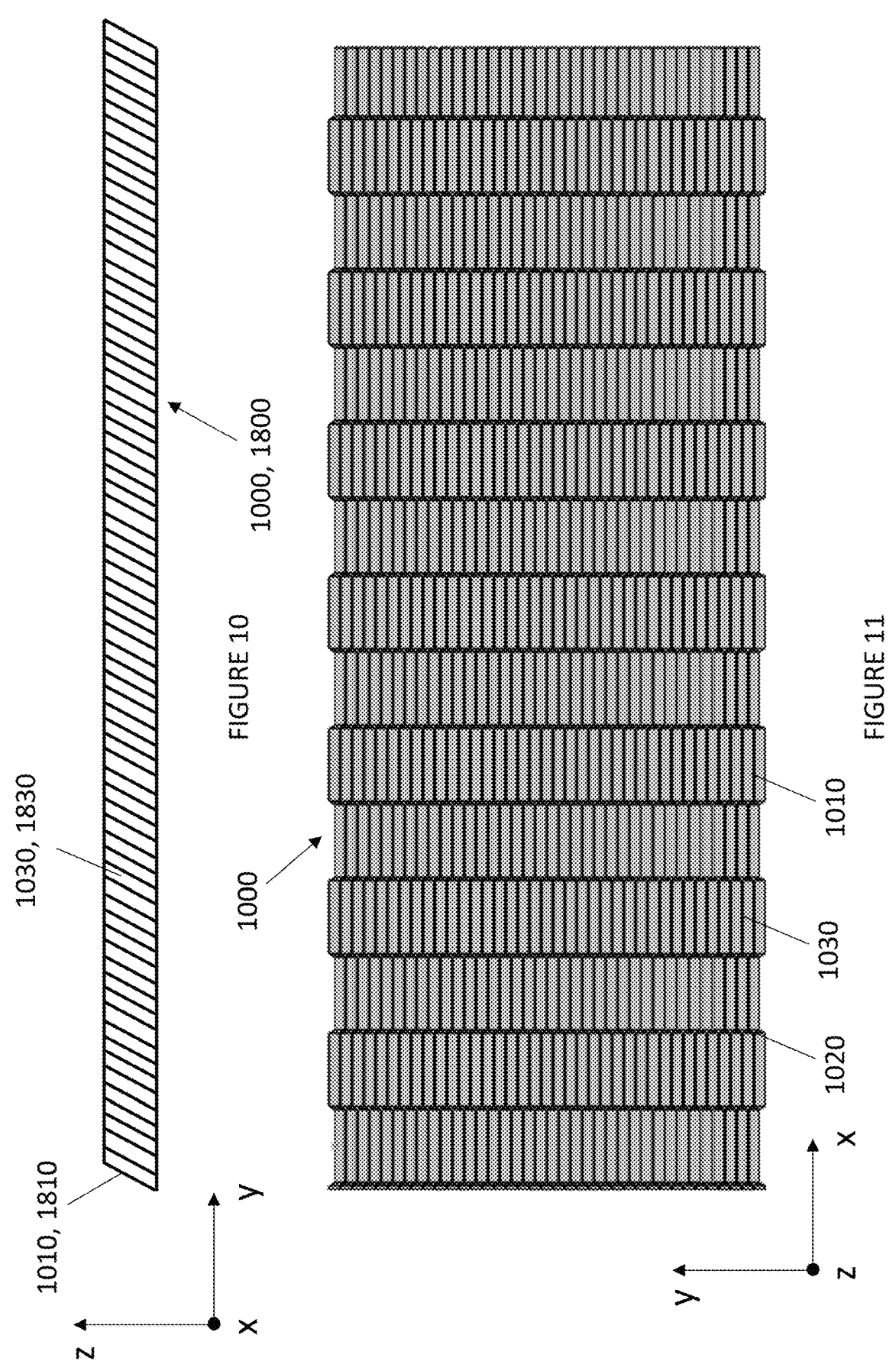
FIG. 10 is a schematic side view of a reflection suppression device according to embodiments of the present disclosure.
FIG. 11 is a schematic plan view of a reflection suppression device according to a first embodiment of the present disclosure.
Figure 12:
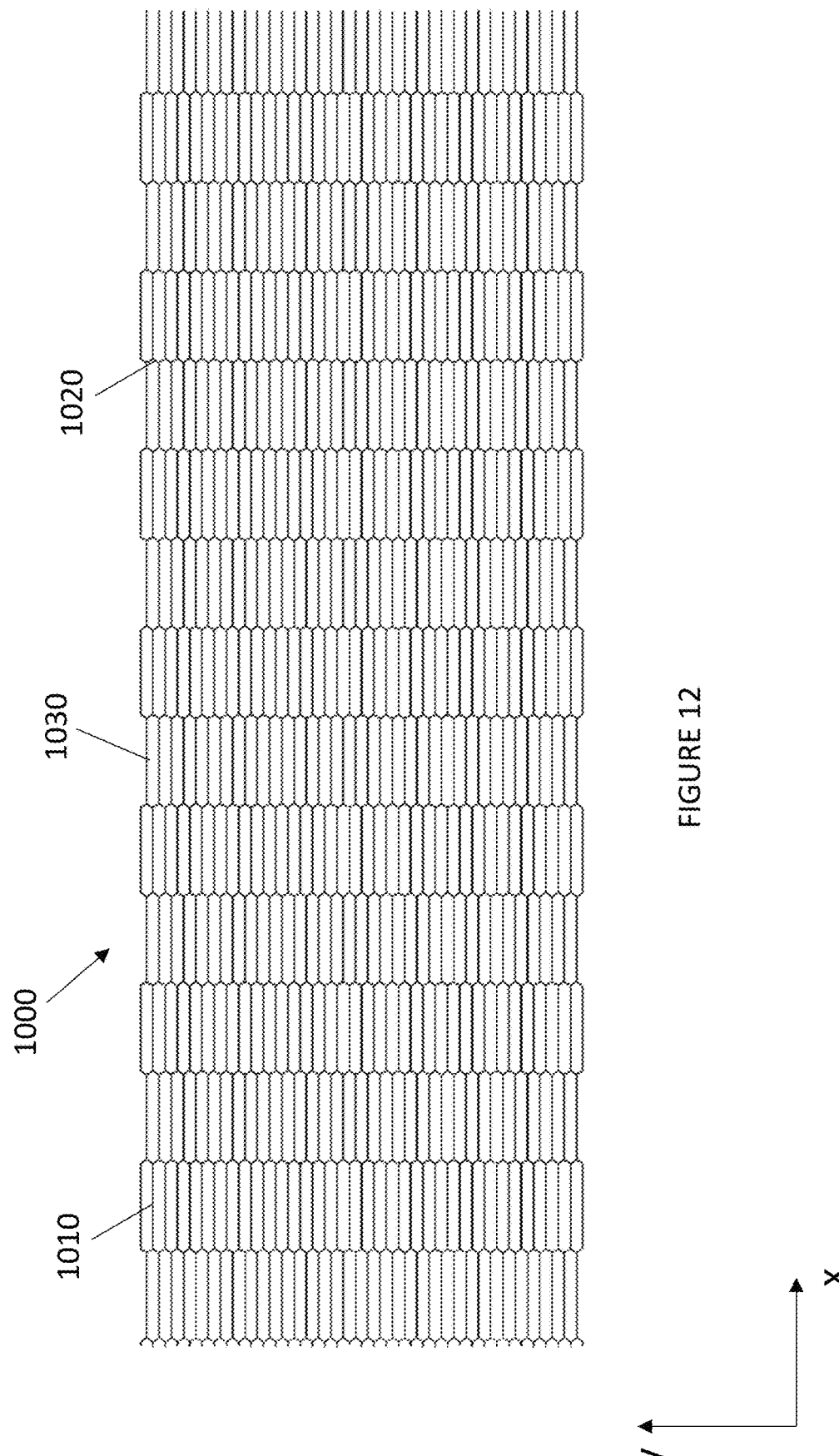
FIG. 12 is a schematic view along an optical path through the reflection suppression device of FIG. 11.

FIGS. 10 to 15 show a first embodiment of an improved reflection suppression device 1000 (that is, an improved light control layer). The reflection suppression device 1000 is a lattice structure formed of a plurality of lattice elements 1030, as will be further described below. FIGS. 10 and 11 show (schematic representations of) the reflection suppression device 1000 in side section and plan views respectively, whilst FIG. 12 shows (a schematic representation of) the reflection suppression device 1000 along the optical path (i.e., the "gut ray") taken by the light passing therethrough.

Figures 13, 14, 15:
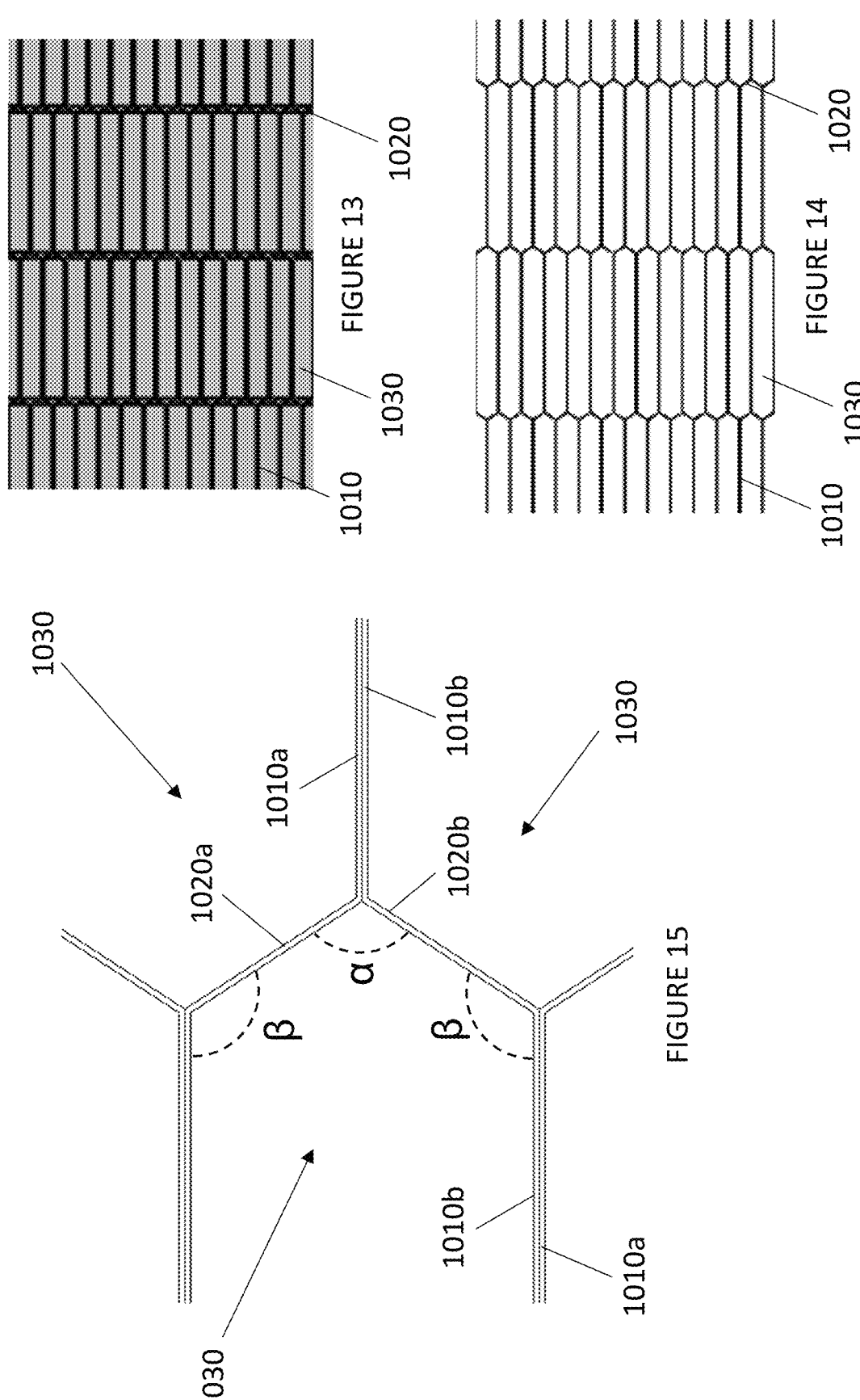
FIG. 13 is a partial view of FIG. 11.
FIG. 14 is a partial view of FIG. 12.
FIG. 15 is a schematic partial view of the reflection suppression device of FIG. 11.

FIGS. 13 and 14 are partial views of FIGS. 11 and 12 respectively. FIG. 15 shows a schematic representation of the joining of several of the lattice elements 1030.

Each lattice element 1030 is formed from a pair of parallel first sides 1010 that act as the louvre slats 710 as described above. As can be best seen in FIG. 15, each lattice element 1030 is connected to the adjacent lattice element 1030 in the y-direction by the first sides 1010, resulting in the louvres effectively having double thickness. That is, each first side 1010 is formed by a pair of first walls 1010*a*, 1010*b*. As described above in relation to the louvre slats 710, the first sides 1010 are arranged at an orientation angle relative to the output surface 642 of the optical component 640 (i.e., a pupil expander or waveguide), to allow the image/display light to pass through the reflection suppression device 1000. That is, as can be seen in FIGS. 11 and 13, the first sides 1010 are angled such that the reflection suppression device 1000 cannot be seen through in the plan view, which acts to suppress the reflections (i.e. glare) as described above. The first sides 1010 are arranged in an alternating pattern. That is, the columns of first sides 1010 that extend in the y-direction alternate in the x-direction between the first sides 1010 being on two sets of parallel, but spatially separated, planes.

Each first side 1010 is joined by a pair of parallel second sides 1020*a* and a pair of parallel third sides 1020*b*. The second and third sides 1020*a*, 1020*b* are the same length, that length being shorter than that of the first sides 1010. The second and third sides 1020*a*, 1020*b* are single thickness, due to the manufacturing method described below. The second and third sides 1020*a*, 1020*b* are arranged at a first angle α with respect to one another and at a second angle β with respect to the neighbouring first sides 1010. The first angle α is in the range of 60° to 180°, such as 80° to 120°, whilst the second angle β is in the range of 60° to 180°, such as 90° to 120°.

Together, the first, second and third sides 1010, 1020*a*, 1020*b* form the lattice elements 1030. The lattice elements 1030 of the first embodiment have an elongated hexagonal shape. The second and third sides 1020*a*, 1020*b* provide reinforcement (i.e. strengthen) the first sides 1010 to allow the reflection suppression device 1000 to act as an "air-spaced" louvre. This removes the need for a transparent material included in the structure to support the louvres, which may impart optical effects on the display light passing through the structure. The second and third sides 1020*a*, 1020*b* provide rigidity to the structure, such that there is less distortion of the first sides 1010 under use. Such a distortion may result in impairment of the reflection suppression function (due to widening the gaps between some of the first sides 1010—i.e. the louvre slats), optical artefacts being visible to the user, or even damage to the lattice structure.

Figure 16:
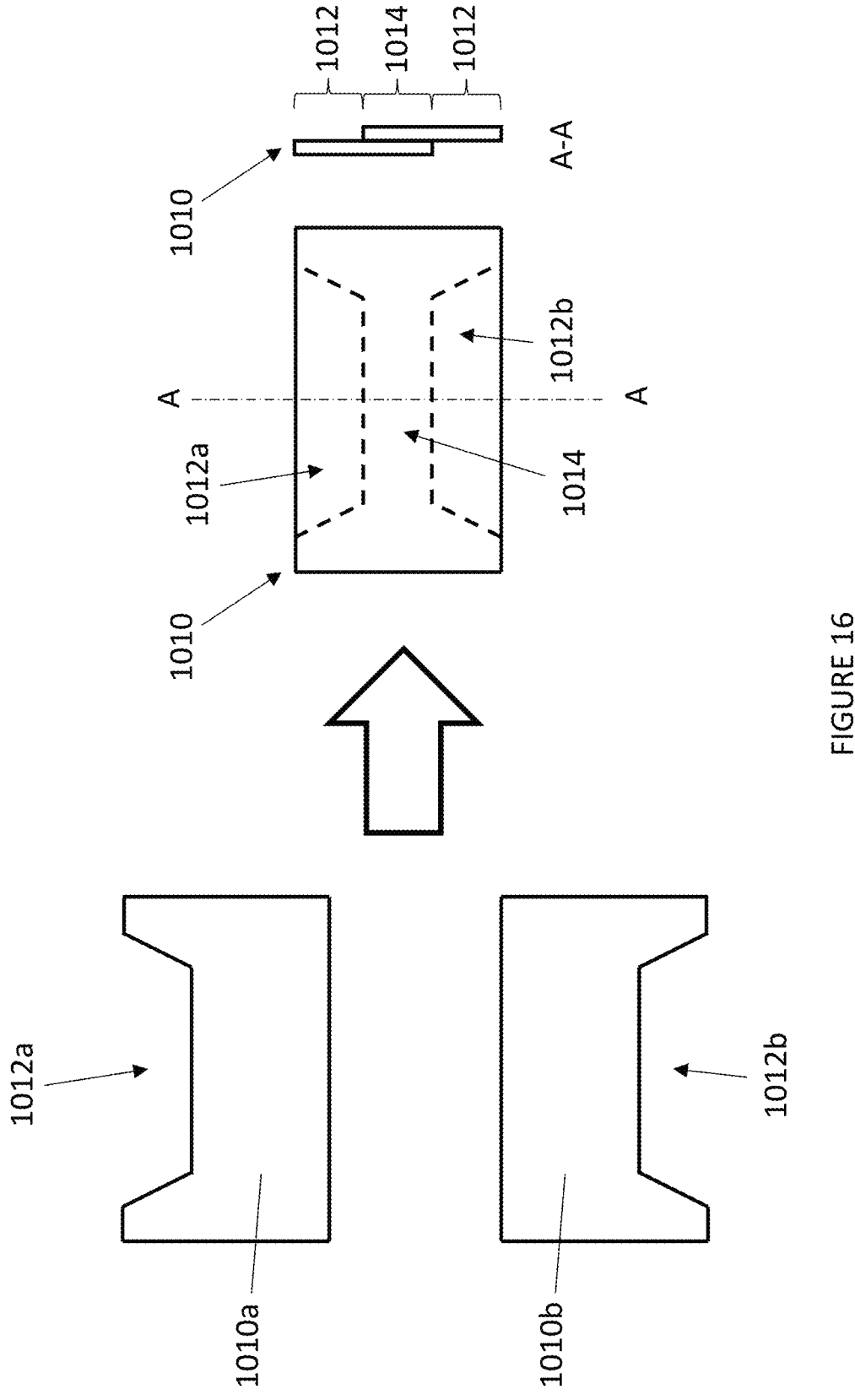
FIG. 16 is a schematic view of a variation of the reflection suppression device of FIGS. 11 to 15.

As shown in FIG. 16, each first wall 1010*a*, 1010*b* of the first sides 1010 may have cutout portions to reduce the thickness of the first sides 1010. That is, each first wall 1010*a*, 1010*b* that makes up each first side 1010 (as described above and as a result of the manufacturing method described below), may have a cutout/recessed portion 1012*a*, 1012*b*. The cutout portion 1010*a*, 1010*b* of each first wall 1010*a*, 1010*b* is on a different side (in the z-direction) to that of the adjacent first wall 1010*a*, 1010*b*. As such, when the first walls 1010*a*, 1010*b* form the first side 1010, there are two thinner regions 1012 (formed due to the cutout portions 1012*a*, 1012*b*) and a double thickness central region 1014. As discussed above in relation to FIG. 9, reducing the thickness of the first sides 1010 (i.e., the louvre slats) is key to reducing the occlusions (more broadly, the optical artefacts) visible to the user. Therefore, the cutout portions 1010*a*, 1010*b* allow for thinner regions 1012 of the first sides 1010 to increase the angles at which the display/image light can pass through the reflection suppression device 1000, whilst the central region 1014 has a double thickness to reinforce/strengthen the first sides 1010.

Figure 19:
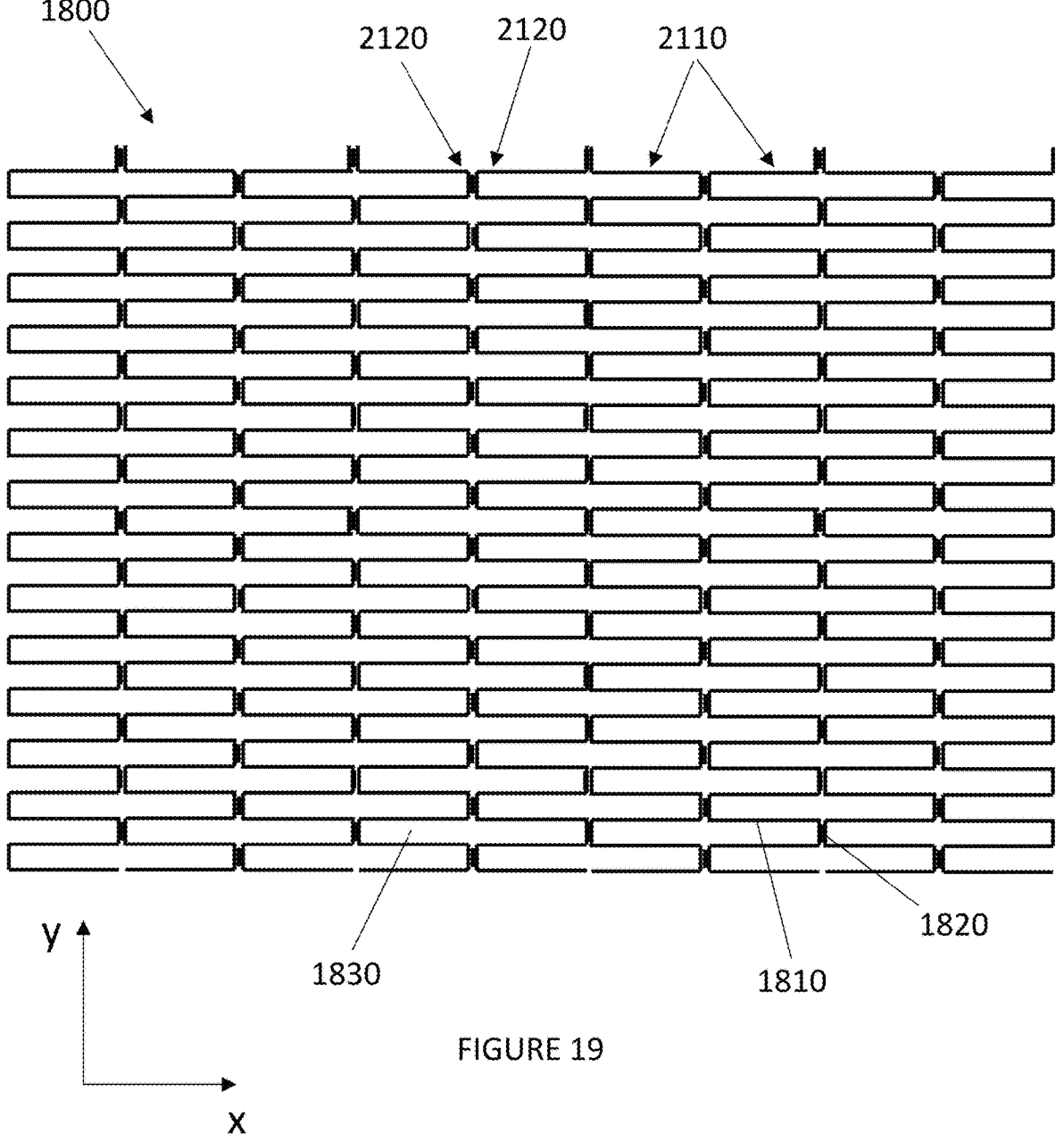
FIG. 19 is a schematic view along an optical path through the reflection suppression device of FIG. 18.

Notably, in a variety of embodiments of the disclosure as otherwise described herein (i.e., in this section and other sections of the disclosure), and as shown in FIG. 11 (and also in FIG. 19 shown below), the tilted channels of the reflection suppression device are provided in a plurality of rows of channels, in which channels of each row are offset from channels of a neighbouring row.

Improved Reflection Suppression Device Manufacturing Method-First Example

Figure 17:
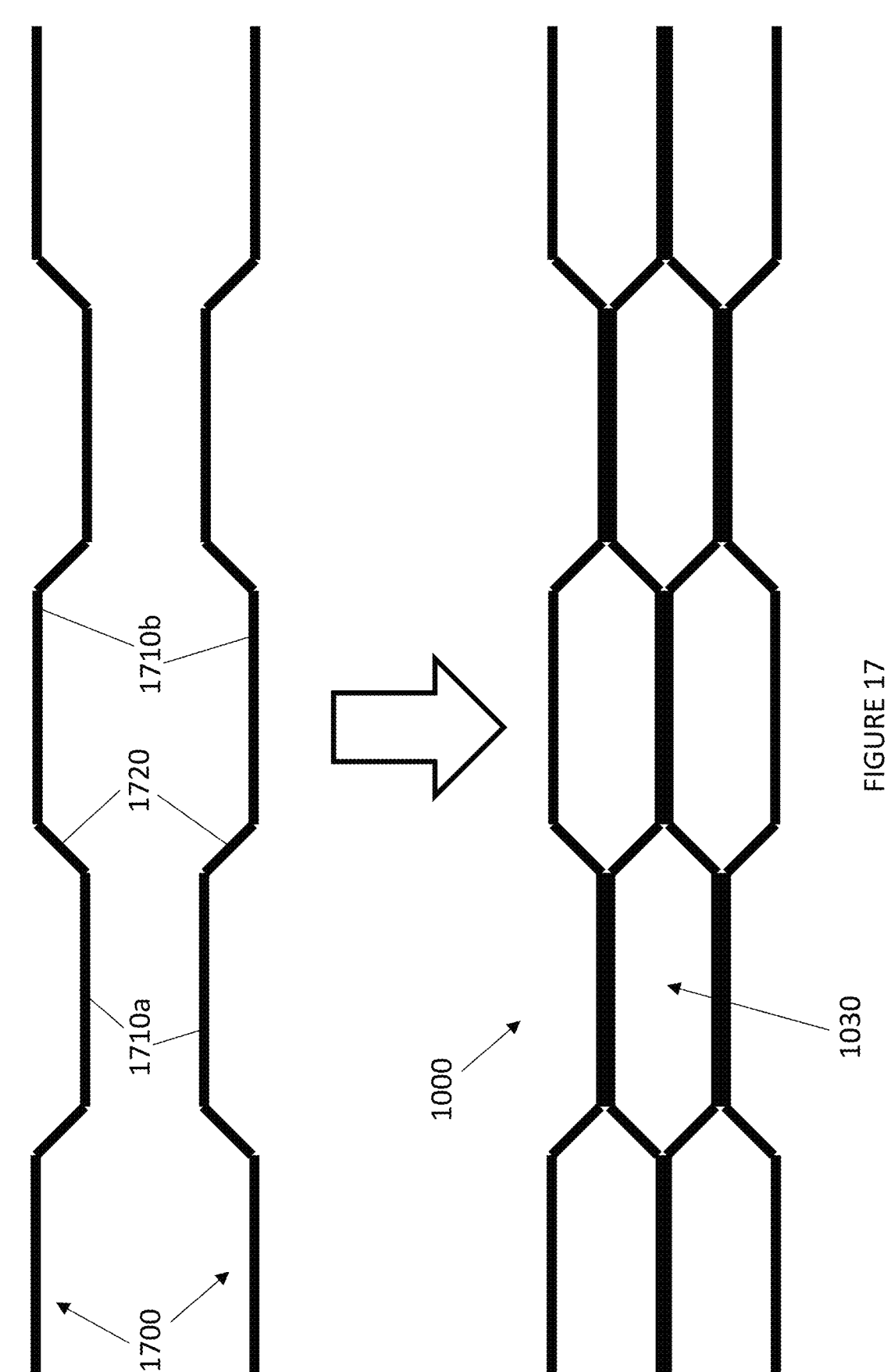
FIG. 17 is a schematic view of a method of manufacturing the reflection suppression device of FIGS. 11 to 16.

FIG. 17 schematically shows a method of manufacturing the reflection suppression device 1000 of the first embodiment. A plurality of strips of material are formed into elongate members 1700 having first portions 1710*a* and second portions 1710*b* separated by connecting portions 1720. This may be, for example, by bending strips of material into the desired shape. The elongate members 1700 are formed such that the first portions 1710*a* are all on the same plane, whilst the second portions 1710*b* are all on their own plane, parallel but spatially separated from the plane of the first portions 1710*a*. The first and second portions 1710*a*, 1710*b* are connected by the angled connecting portions 1720, which pass between the two planes. The angle at which the connecting portions 1720 are connected to the first portions 1710*a* corresponds to the first angle α as described above, whilst the angle at which the connecting portions 1720 are connected to the second portions 1710*b* is the second angle β as also described above.

The elongate members 1700 are arranged and joined "back-to-back", such that the first portions 1710*a* of a first elongate member 1700 are joined to the first portions 1710*a* of a second elongate member 1700. Then, the second portions 1710*b* of the second elongate member 1700 are joined to the second portions 1710*b* of a third elongate member 1700, before the first portions 1710*a* of a fourth elongate member 1700 are joined to the first portions 1710*a* of the third elongate member 1700. This process is repeated until the reflection suppression device 1000 is formed. That is, the joining of the first and second portions 1710*a*, 1710*b* form the first sides 1010 of the reflection suppression device 1000 as described above, whilst the connecting portions 1720 form the second and third sides 1020*a*, 1020*b*, together forming the lattice elements 1030. The joining of adjacent first and second portions 1710*a*, 1710*b* forms the double thickness first sides 1010 as also described above.

Improved Reflection Suppression Device—Second Example

Figure 18:
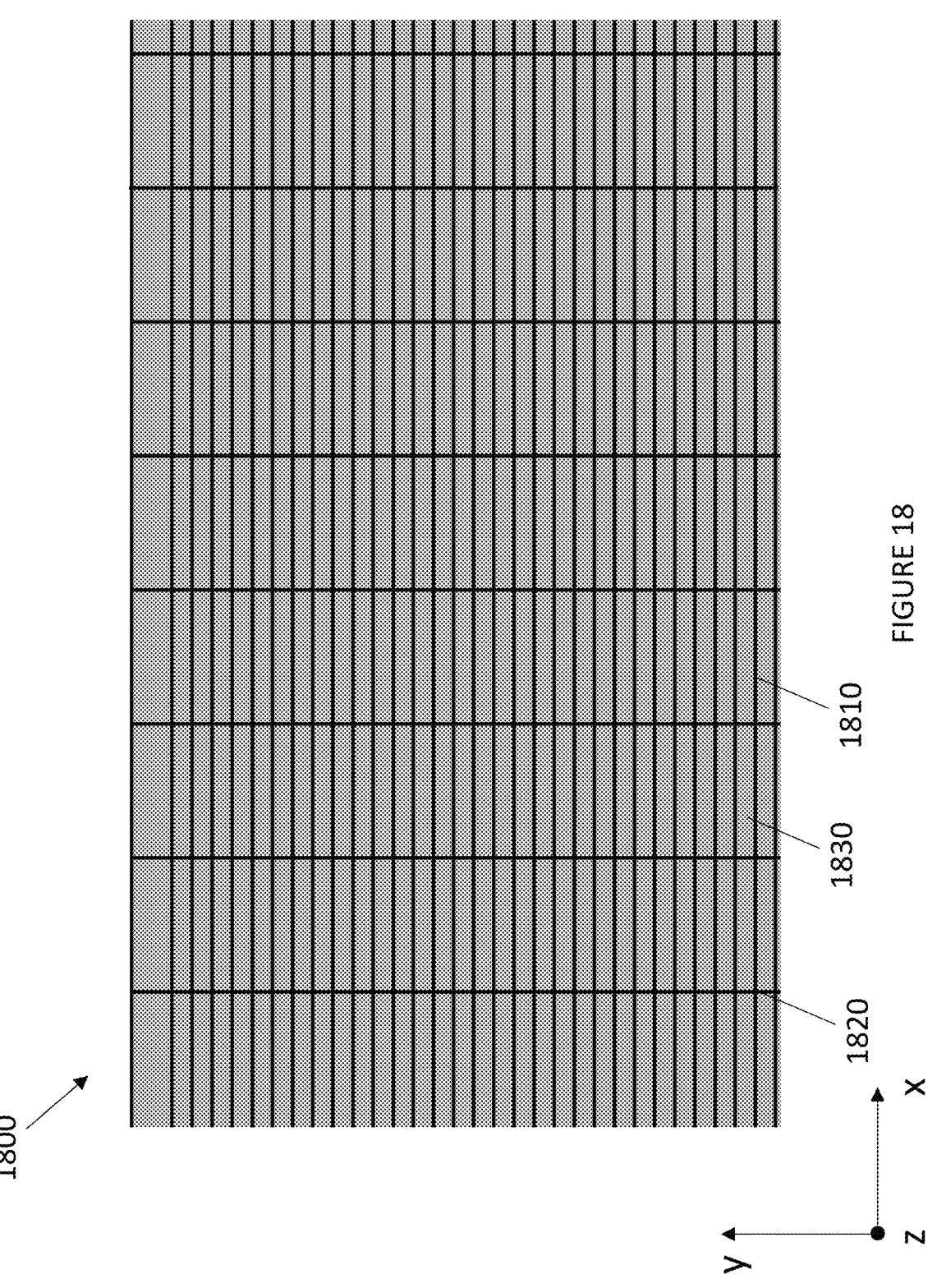
FIG. 18 is a schematic plan view of a reflection suppression device according to a second embodiment of the present disclosure.

FIGS. 18 and 19 show a second embodiment of an improved reflection suppression device 1800 (that is, an improved light control layer). As in the first embodiment, the reflection suppression device 1800 is a lattice structure formed of a plurality of lattice elements 1830, as will be further described below. FIG. 18 shows (a schematic representation of) the reflection suppression device 1800 in a plan view, whilst FIG. 19 shows (a schematic representation of) the reflection suppression device 1800 along the optical path (i.e., a "gut ray") taken by the light passing therethrough. The reflection suppression device 1800 has the side section view as shown in FIG. 10.

The lattice structure of the reflection suppression device 1800 is formed of a plurality of parallel first walls 1810 (i.e., louvre slats 710, as described above). These first walls 1810 extend in the x-direction and provide the reflection suppression (i.e., the glare mitigation) function described above. The first walls 1810 are connected in the y-direction by a plurality of parallel second walls 1820, the first and second walls 1810, 1820 forming a plurality of lattice elements 1830. The second walls 1820 provide the strengthening function as described above in relation to the second and third sides 1020a, 1020b of the first embodiment. The first and second walls 1810, 1820 are substantially perpendicular to one another in the x-y plane—that is, the angles between the first and second walls 1810, 1820 in the x-y plane are as close to 90° as is possible within the manufacturing constraints. In other words, the lattice elements 1830 are substantially rectangular in shape. As will be further explained with regards to the manufacturing method described below, the reflection suppression device 1800 of the second embodiment functionally is the lattice element structure of the first embodiment with the first angles α at 180° and the second angles β at 90°.

Due to the manufacturing method describe below, as and best seen in FIG. 19, the double thickness portion of each lattice element 1830 is in the y-direction—i.e. the shorter second walls 1820, rather than the longer first walls 1810. As such, the walls providing the reflection suppression (i.e. the glare mitigation) function are as thin as possible. As discussed above in relation to FIG. 9, reducing the thickness of the louvre slats (i.e., the first walls 1810) is key to reducing the occlusions (more broadly, the optical artefacts) visible to the user. As such, having the first walls 1810 be single thickness improves the quantity of display/image light that can pass through the glare mitigation device 1800. Furthermore, the spacing between the second walls 1820 is greater than the spacing between the first walls 1810, and as such there is a greater surface in the x-y plane covered by the first walls 1810 than the second walls 1820. Therefore, the occlusions are further reduced by having the second walls 1820 (which cover less of said surface area) be at double thickness.

The substantially rectangular shape of the lattice elements 1830 being arranged in a landscape orientation in the x-y plane (that is, with the longer first sides 1810 extending in the x-direction and the shorter second sides 1820 extending in the y-direction) provides a further synergistic effect with the image light passing therethrough. That is, the image to be displayed is often in a landscape orientation as viewed by the user in the viewing area/window. Due to reflection of the image light off an optical combiner (such as the windscreen 650) as described above, the y-direction of the reflection suppression structure 1800 will be viewed as the vertical direction of the image as visible to the user. As the image has more content in the horizontal direction (as it is landscape in orientation), which corresponds to the x-direction of the reflection suppression device 1800, it is more important to preserve more angles of light in this x-direction that are able to pass through the lattice elements 1830. Hence, it is beneficial to have the lattice elements 1830 arranged in a landscape fashion in the x-y plane. This synergistically combines with the need to have the first walls 1810 at a set pitch (as described above) for the reflection suppression to function correctly.

Finally, the second walls 1830 being substantially perpendicular to the first walls 1810 reduces their effective thickness as compared to the second and third sides 1020a, 1020b of the first embodiment. That is, the angular extension of the second and third sides 1020a, 1020b in the x-direction may block some further image light, thus effectively making the second and third sides 1020a, 1020b have an optical thickness as large in the x-direction as the gaps between the first sides 1010. Thus, by arranging the second walls 1820 perpendicularly to the first walls 1810, the effective optical thickness is merely the width of the second walls 1820 in the x-direction—therefore blocking less image light and reducing the occlusions produced.

For the both the reflection suppression devices 1000, 1800 of the first and second embodiments, and as the skilled person will appreciate, any one or more of the parameters, specifically the width, thickness, pitch and orientation angle, of the first sides 1010 or first walls 1810 (i.e. the louvre slats), may be selected to provide the required overlap, overhang or shadow region as described above. This may be according to application requirements (e.g. orientation of the optical component, pupil expander or waveguide relative to the horizontal, shape of the optical combiner or windscreen and position of the optical component, pupil expander or waveguide with respect to the optical combiner/windscreen in situ).

In addition, the pitch (or spacing interval) between the first sides 1010 or first walls 1810 may be selected to minimise diffractive effects on the output image light, in order to avoid adversely affecting the quality of the image at the viewing area (or viewing window/eye-box). In some embodiments, the pitch of the first sides 1010 or first walls 1810 is at least two orders of magnitude greater than the wavelength or wavelengths of the image/display light. Typically, the image light comprises visible wavelengths such as red, green and blue wavelengths output by laser light sources. In some examples, the thickness of the first sides 1010 or first walls 1810 is in the range of 2 to 250 μm, and preferably less than 170 μm such as in the range 20 to 200 μm. The thickness will be chosen to balance the need for mechanical robustness and maintaining image quality. The pitch (spacing interval) of the first sides 1010 or first walls 1810 may be in the range of 0.5 to 3 mm, preferably 1 to 2 mm. In some examples, the width of the first sides 1010 or first walls 1810 is in the range 2 to 15 mm, and the orientation angle of the first sides 1010 or first walls 1810 is in the range 10° to 45° and preferably 25° to 35°. This largely depends on the rake of the optical combiner/windscreen. As the skilled person will appreciate, the length of the first sides 1010 or first walls 1810 should be substantially the same as the corresponding dimension of the optical component on which the reflection suppression device 1000, 1800 is disposed. The ratio of the lengths of each side of the lattice elements (i.e., the ratio of the length of the first sides to the length of the second sides) is in the range of 2:1 to 50:1, such as 3:1 to 10:1. This ratio is a balance between mechanical strength (with a smaller ratio) and fewer occlusions (with a larger ratio).

Furthermore, the Figures show the lattice structure of the reflection suppression devices 1000, 1800 of the first and second embodiments schematically. As such, the size, shape, number, orientation, proportions and arrangements of the lattice elements 1030, 1830, and indeed the reflection suppression devices 1000, 1800 as a whole, may differ from those shown in the Figures.

Figure 20:
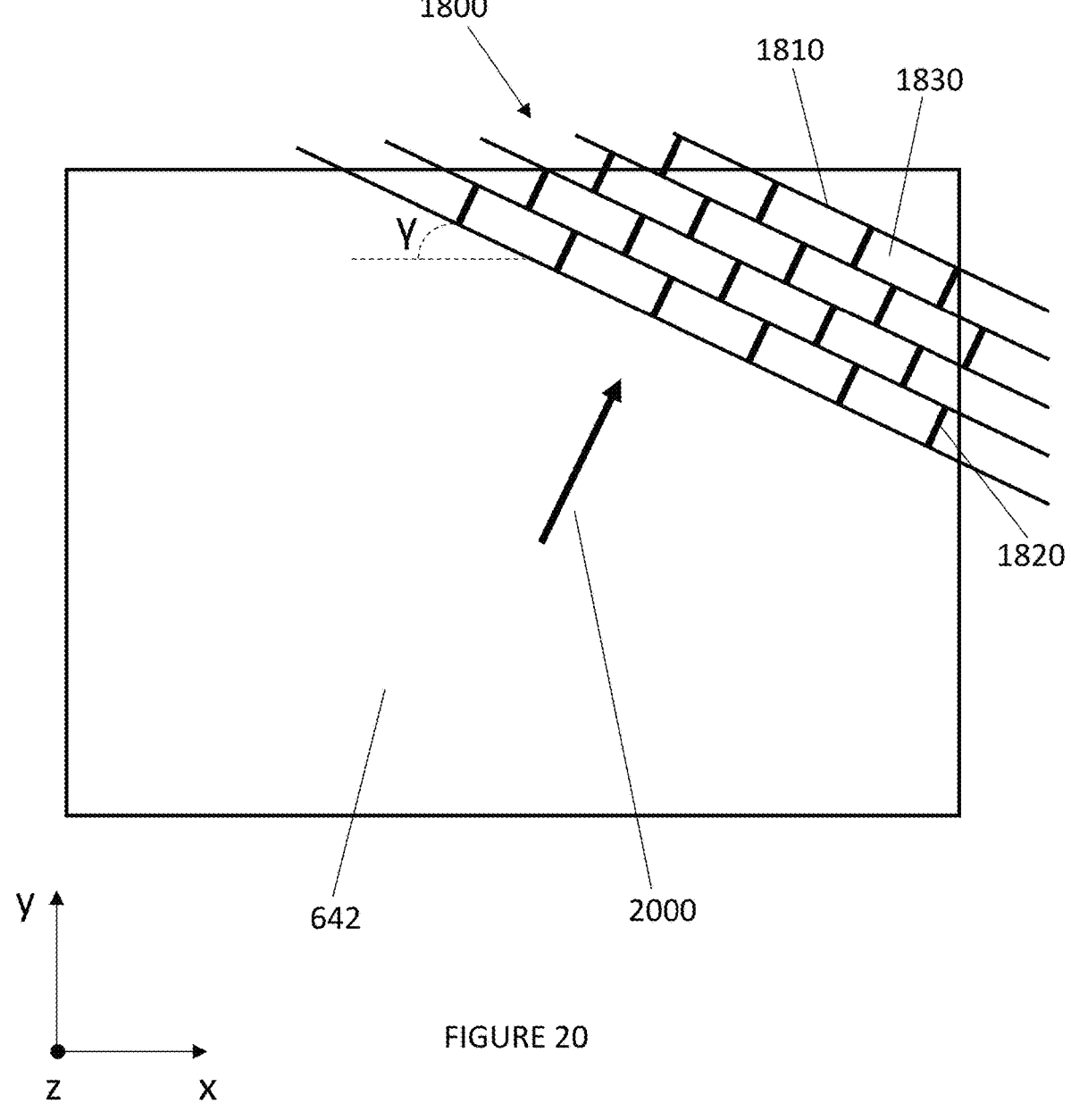
FIG. 20 is a schematic plan view of a first variation of the reflection suppression device of FIGS. 18 and 19.

FIG. 20 shows a variation of the reflection suppression device 1800 of the second embodiment, however it is also applicable to the first embodiment. FIG. 20 is a schematic plan view of the output surface 642 of the optical component (as described above). Due to (for example) a turning film covering the output surface 642, the display/image light is emitted therefrom at a compound angle that has components in both the y-z and x-z planes. This light is shown by the "gut ray" 2000—that is, the ray that passes from a defined centre of the display device to a defined centre of the viewing window, via the optical component 640 and the output surface 642. This compound angle is chosen to ensure that the user sees the image displayed in the correct "landscape" orientation and the viewing window is in the correct position, taking into account the reflection of the image light off the complex curvature of the optical combiner/windscreen 650.

In this variation, the first walls 1810 are arranged at an angle γ such that the first walls 1810 extend in a direction on the x-y plane that is perpendicular to the direction of the "gut ray" 2000 of the image light emitted from the output surface 642. The angle γ is in the range of 0° to 45°, such as 20° to 35°. Due to the aforementioned angle at which the image light is emitted from the output surface 642, the direction in which the first walls 1810 extends will correspond to the horizontal direction of the image as visible to the user. The reflection suppression device 1800 is shown in FIG. 20 as only extending over part of the output surface 642 only, however this is for illustrative purposes only, and the reflection suppression device 1800 would cover the whole of the output surface 642. To be clear, the first walls 1810 still extend from away from the output surface 642 at an orientation angle to further match the "gut ray" 2000, as described above.

By rotating the reflection suppression device 1800 by the angle γ in the x-y plane, the lattice elements 1830 are better aligned to the "gut ray" 2000. As such, less of the image light is blocked by the walls 1810, 1820 of the lattice elements 1830, reducing the occlusions produced. As the "gut ray" 2000 can be seen as an average angle at which the image light is emitted from the output surface 642, aligning the lattice elements 1830 to the "gut ray" 2000 is an effective method of reducing the occlusions produced without increasing the complexity of the lattice structure.

Improved Reflection Suppression Device Manufacturing Method-Second Example

FIGS. 21 to 28 schematically show a method of manufacturing the reflection suppression device 1800 of the second embodiment.

Figures 21, 22:
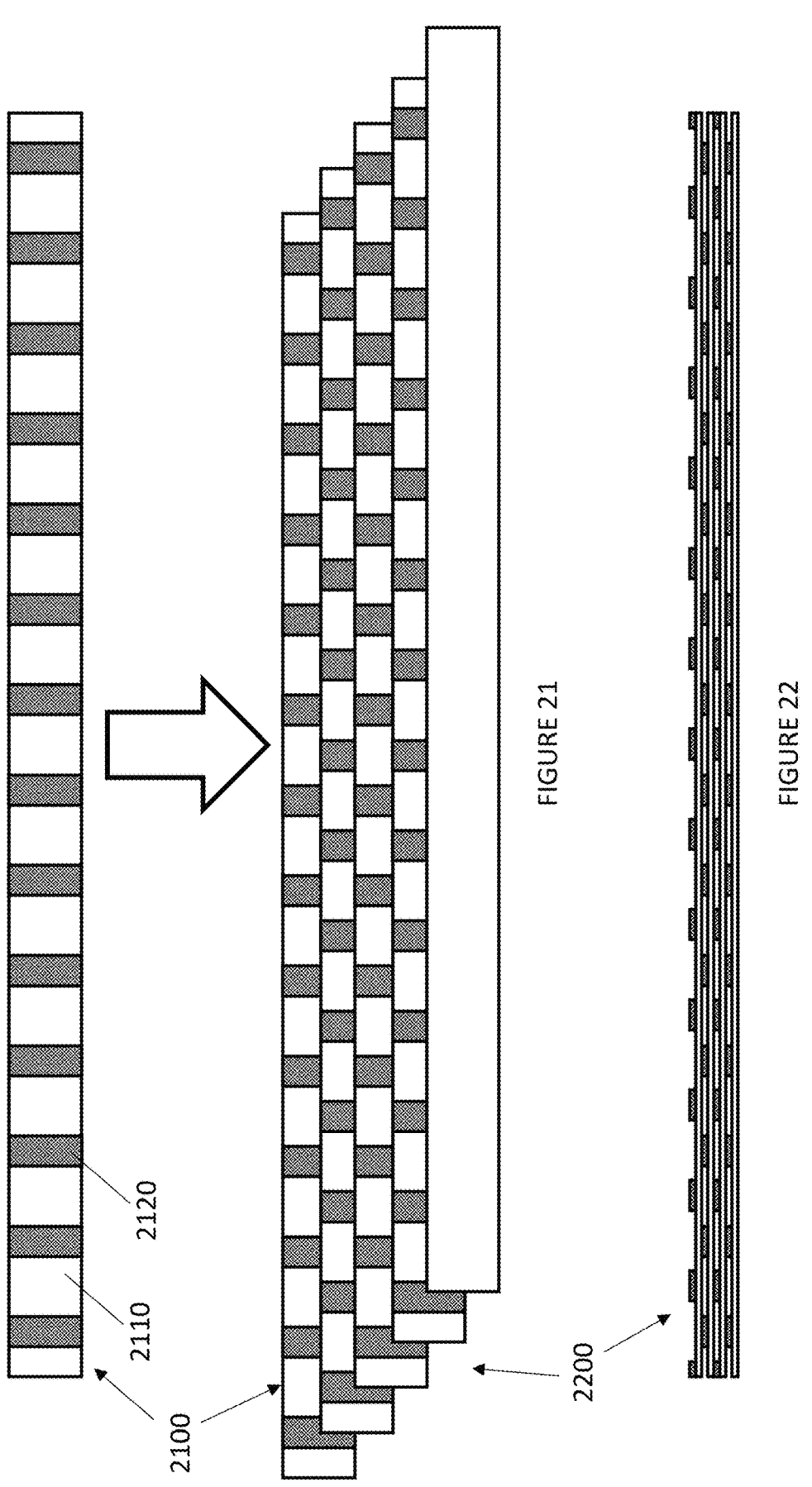
FIG. 21 is a schematic view of a first step of a method of manufacturing the reflection suppression device of FIGS. 18 and 19.
FIG. 22 is a schematic side view of the partial product produced using the method step of FIG. 21.

In a first step, a plurality of sheets of material 2100 are combined to form a stack of parallel sheets 2200, the joining occurring in a striped pattern along the sheets. FIG. 21 shows a thin section of a sheet of material 2100 with alternating free portions 2110 and joined portions 2120. That is, each sheet 2100 is joined to the adjacent sheet 2100 by joining portions 2120 (e.g. by an adhesive) to form the stack 2200. The thickness of the joining portions 2120 determines the extension of the second walls 1820 in the y-direction, whilst the first walls 1810 are double the width of the free portions 2110, as can be seen in FIG. 19. The second (lower) part of FIG. 21 shows a schematic view of the alternating joining portions 2120 that form the stack 2200 schematically shown in FIG. 22 (in a side section view).

Figures 25, 26, 27, 28:
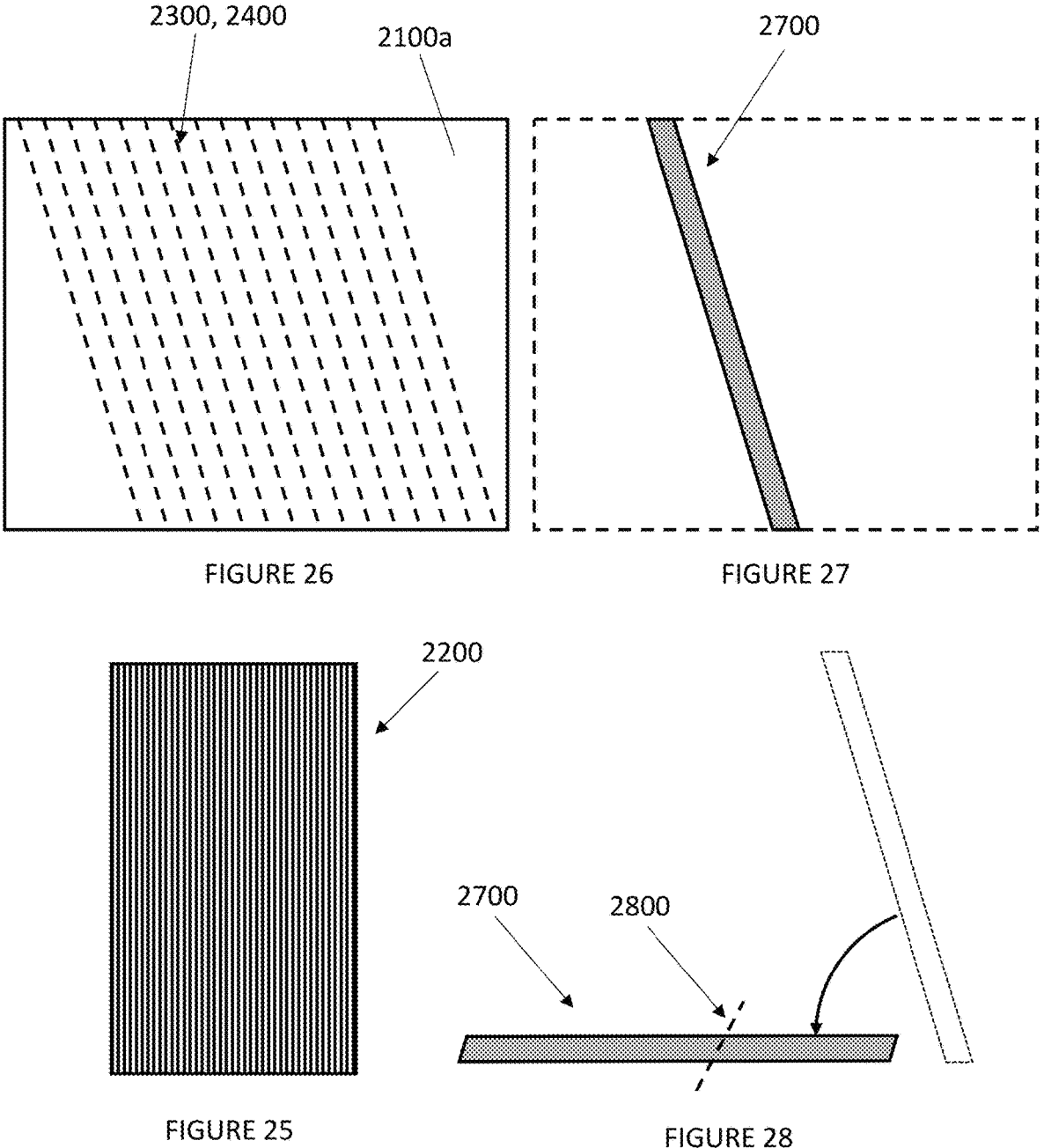
FIG. 25 is a first schematic side view of the second step of FIGS. 23 and 24.
FIG. 26 is a second schematic side view of the second step of FIGS. 23 and 24.
FIG. 27 is a first schematic side view of the partial product produced using the method step of FIGS. 23 and 24.
FIG. 28 is a second schematic side view of the partial product produced using the method step of FIGS. 23 and 24.

In a next step, the stack 2200 is cut along a cutting plane 2300, 2400, as schematically shown in FIGS. 23 to 28. That is, all the sheets 2100 of the stack 2200 are cut along the cutting plane 2300, 2400. The stack 2200 has a first sheet 2100*a* and a last sheet 2100*b*. FIG. 25 shows a schematic side view of the sheets 2100, through which the stack 2200 is cut, along the cutting plane 2300, 2400.

Figure 23:
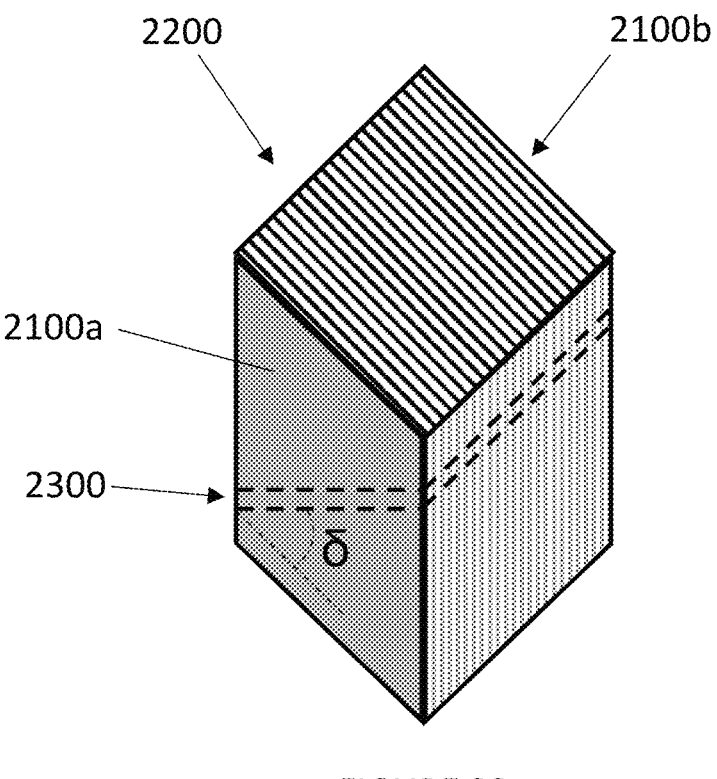
FIG. 23 is a schematic view of a first variation of a second step of a method of manufacturing the reflection suppression device of FIGS. 18 and 19.
Figure 24:
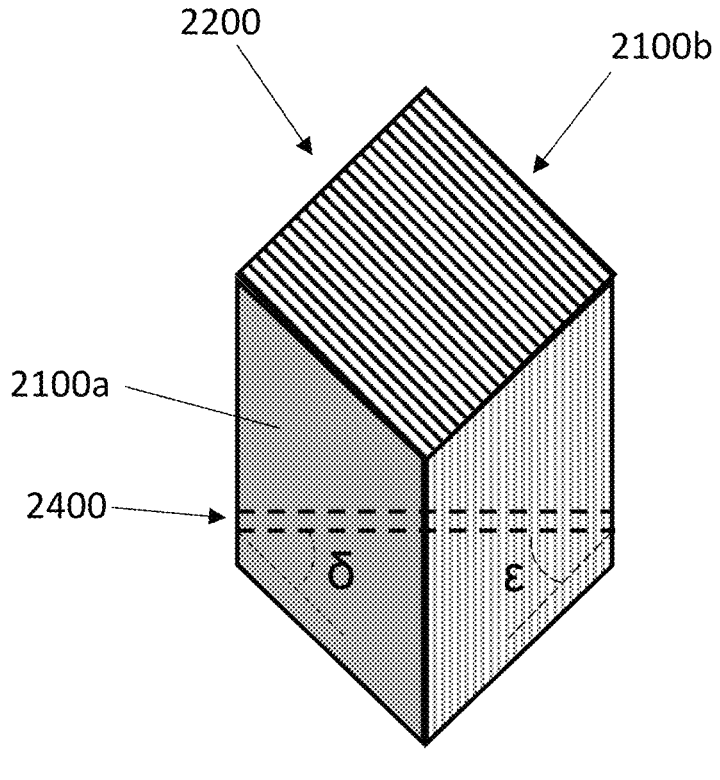
FIG. 24 is a schematic view of a second variation of a second step of a method of manufacturing the reflection suppression device of FIGS. 18 and 19.

FIGS. 23 and 24 show two different embodiments of cutting the stack 2200. In FIG. 23, the stack 2200 is cut along a first cutting plane 2300 that is perpendicular to a plane of sheets 2100. That is, the first cutting plane 2300 is perpendicular to the first sheet 2100*a* (and by extension, all of the sheets 2100). The first cutting plane 2300 is at an angle θ relative to the edges of the sheets 2100. This angle δ may be in the range of 0° to 65°, such as 20° to 40°, and helps define the orientation angle at which the first walls 1810 (i.e., the louvre slats) extend in the y-z plane (that is, relative to the optical component, e.g. the pupil expander or waveguide they are arranged on top of in the y-direction). Such a cutting plane 2300 produces a lattice structure that has second walls 1820 that are perpendicular to the x-y plane when in use (that is, perpendicular to a plane of the lattice structure or that are contained within the y-z plane).

Meanwhile, in FIG. 24, the stack 2200 is cut along a second cutting plane 2400 that is at an angle ε to a plane of sheets 2100. That is, the second cutting plane 2400 is at an angle ε to the first sheet 2100*a* (and by extension, all of the sheets 2100). This angle ε may be in the range of 0° to 25°, such as 10° to 25°, and helps define a further orientation angle at which the second walls 1820 extend in the x-z plane (that is, relative to the optical component, e.g. the pupil expander or waveguide they are arranged on top of in the x-direction). As with the first cutting plane 2300, the second cutting plane 2400 is at an angle δ relative to the edges of the sheets 2100. Using this cutting plane 2400, lattice elements can be produced that also better account for the angle of image light passing therethrough in the x-direction. That is, the second cutting plane 2400 can be used to produce second walls 1820 that extend in the x-direction to better match the "gut ray" 2000 as described above, in addition or in an alternative solution to the first variation described above in relation to the FIG. 20.

FIG. 26 schematically shows a plan view of the first sheet 2100*a* and the plurality of cutting planes 2300, 2400 that are taken through the stack 2200. As such, multiple lattice structures can be made from single stack 2200. FIG. 27 schematically shows a single lattice structure 2700 that has been produced by cutting through the stack 2200, as described above. FIG. 28 schematically shows how the lattice structure 2700 produced is rotated when used, with the image light 2800 passing through the lattice structure as described above.

In a final step, the cut lattice structure 2700 is expanded into the full lattice structure described above and shown in FIGS. 18 and 19. Tension is applied to the first sheet 2100*a* relative to the last sheet 2100*b* of the stack, causing the cut lattice structure 2700 to expand and form the lattice elements 1830. That is, the tension applied is diffused throughout the cut lattice structure 2700 via the joining portions 2120 of each sheet 2100. The angle between the free portions 2110 and joining portions 2120 decreases from 180° (as seen in FIG. 22) as the expansion occurs.

Traditionally, this expansion step would stop when the lattice elements had reached a desired hexagonal shape. However, the inventors have realised that the expansion can continue to form the substantially rectangular lattice elements 1830 described above. That is, the expansion continues until the angles between adjacent free and joining portions 2110, 2120 become 90° and the angle between adjacent free portions 2110 become 180°. Thus, as seen in FIG. 19, adjacent joining portions 2120 become the double thickness second walls 1820, whilst adjacent free portions 2110 become the single thickness first walls 1810.

Arched Reflection Suppression Device

Figures 29, 30, 31:
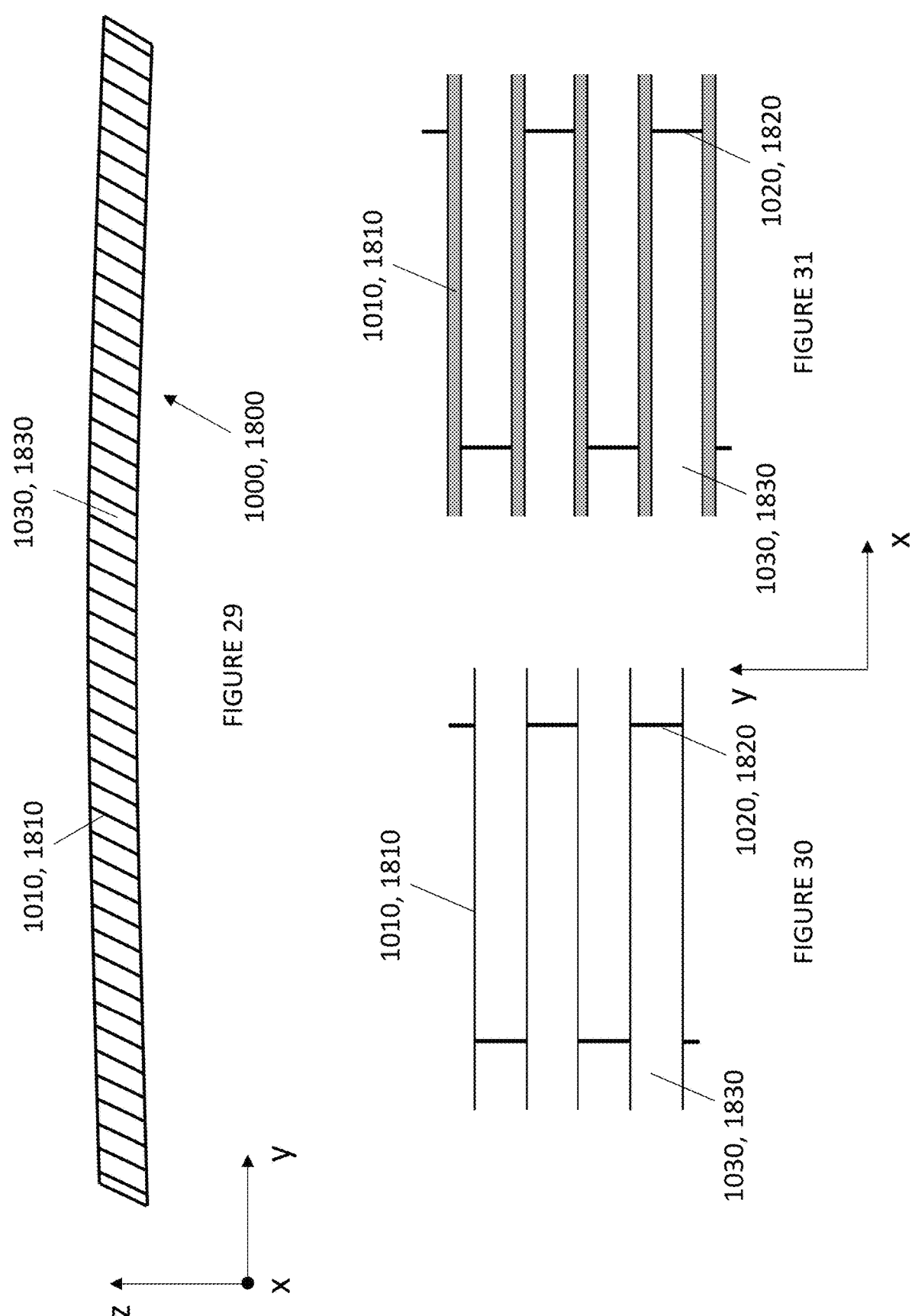
FIG. 29 is a schematic side view of a reflection suppression device according to a third embodiment of the present disclosure.
FIG. 30 is a first schematic plan view the reflection suppression device of FIG. 29.
FIG. 31 is a second schematic plan view the reflection suppression device of FIG. 30.

In a variation of the first and second embodiments described above, the reflection suppression device 1000, 1800 may be curved or arched, as schematically shown in FIGS. 29 to 31. FIG. 29 schematically shows reflection suppression device 1000, 1800 as being curved about the x-direction. The reflection suppression device 1000, 1800 is as described above, aside from the addition of the curvature. That is, the first sides/walls 1010, 1810 (i.e. the louvre slats) are arranged at a constant angle before the curvature is applied. As a result of the curvature, each first side/wall 1010, 1810 will be arranged at a slightly different angle in the y-z plane compared to the neighbouring first sides/walls 1010, 1810. Depending on the nature of the curvature, this change in orientation angle may be linear for first sides/walls 1010, 1810 across the y-direction.

FIG. 30 schematically shows a first partial view of the reflection suppression device 1000, 1800 along an axis of the image light passing therethrough (as in FIGS. 12, 14, 15 and 19). FIG. 30 is taken on a first point along the reflection suppression device 1000, 1800 in the y-direction. FIG. 31 schematically shows a second partial view of the reflection suppression device 1000, 1800 as in FIG. 30, but taken from a point further along the reflection suppression device 1000, 1800 in the y-direction. As can be seen, whilst the second/third sides/walls 1020, 1820 remain at the same thickness, the first sides/walls 1010, 1810 appear at different thicknesses at different points along the reflection suppression device 1000, 1800 in the y-direction, due to the curvature. Although FIGS. 30 and 31 only show the second walls 1820 of the second embodiment, this is also equally applicable to the first embodiment.

The inventors have found that the image light is emitted from the optical component (i.e. the pupil expander or waveguide) at varying angles across the output surface thereof (as described above). That is, whilst the "gut ray" is used to define an average angle at which the image light is emitted from the optical component, this angle will vary across the surface of the optical component. As such, curvature of the reflection suppression device 1000, 1800 about the x-axis allows each lattice element 1030, 1830 to be angled in a direction closer to the angle of the image light emitted from said output surface at that point across the output surface. By more closely aligning the lattice elements 1030, 1830 with the orientation angle of image light emitted from each point across the output surface, less image light will be blocked by the first sides/walls 1010, 1810, reducing the occlusions produced.

In a further variation (not shown), the reflection suppression device 1000, 1800 may also/alternatively been curved about the y-direction. This would change the orientation angle of the second/third sides/walls 1020, 1820 across the reflection suppression device 1000, 1800 in the x-direction. This further/alternative curvature helps to account for angular changes in the image light emitted from different points of the output surface of the optical component in the x-direction.

Hinged Reflection Suppression Device

As discussed above, the reflection suppression device 1000, 1800 device is, in use, placed above the optical component 640 (i.e., the pupil expander or replicator, as described above). That is, the reflection suppression device 1000, 1800 is placed above the output surface 642 of the optical component 640 in the z-direction, in the optical path of the image light from the output surface 642 to a user, via reflection from an optical combiner 650 (e.g. a windscreen of a vehicle).

Figure 32:
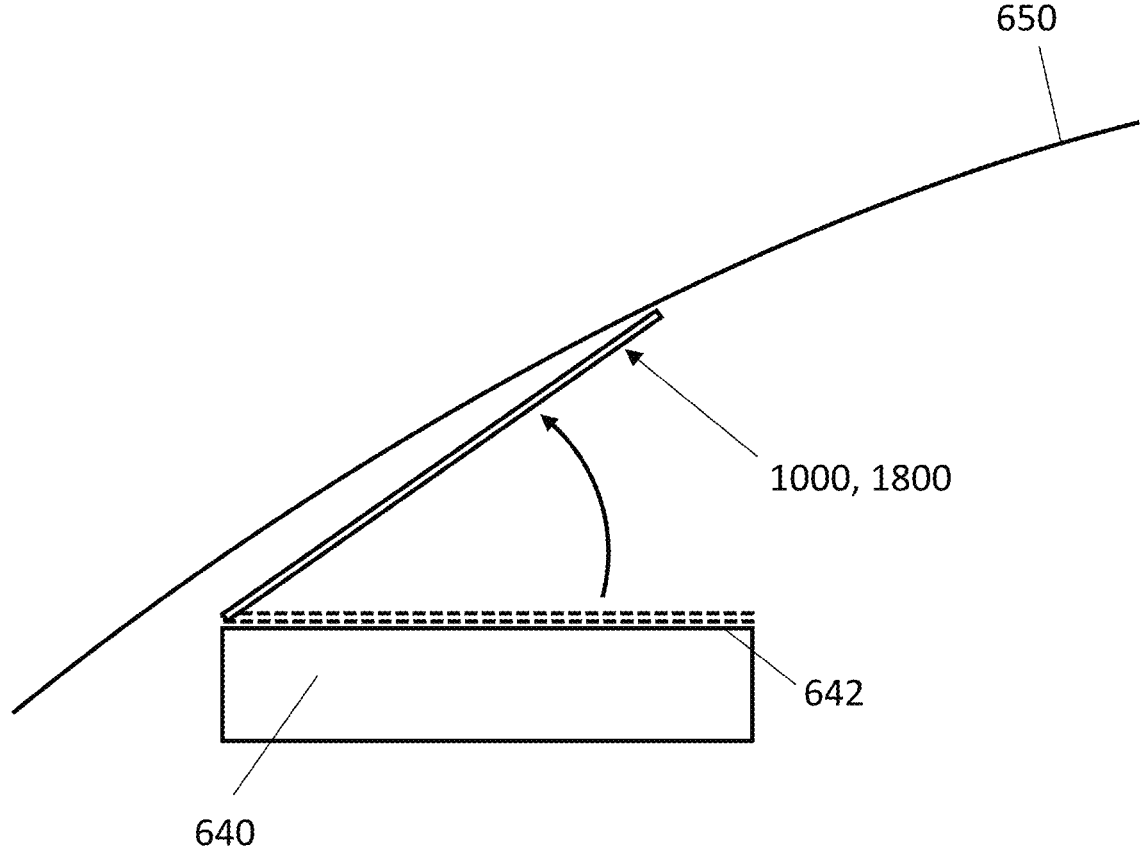
FIG. 32 is a schematic side view of a reflection suppression device according to a fourth embodiment of the present disclosure.
Figure 32:
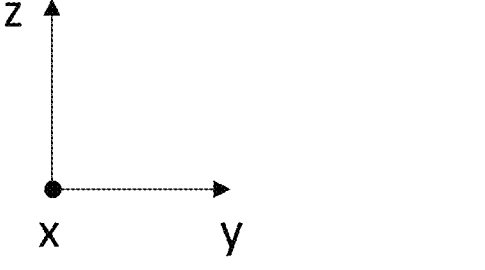

In a further variation, the reflection suppression device 1000, 1800 is secured relative to the optical component 640 via a hinge or pivot, such that the reflection suppression device 1000, 1800 can rotate relative to the output surface 642. This is schematically shown in FIG. 32. FIG. 32 shows rotation of the reflection suppression device 1000, 1800 in an anticlockwise direction about the x-axis from a point of the output surface 642 closest to the optical combiner 650. However, variations of the rotation direction and axis of the reflection suppression device 1000, 1800 relative to the output surface 642 are also envisaged.

Having the reflection suppression device 1000, 1800 be hinged relative to the output surface 642 allows both the lattice structure of the reflection suppression device 1000, 1800 and the output surface 642 to be accessed for cleaning. Furthermore, it ensures that the reflection suppression device 1000, 1800 cannot be removed to dislodged before/during use, which may cause safety issues. The reflection suppression device 1000, 1800 may further have a latching mechanism to secure/prevent the rotation of the reflection suppression device 1000, 1800 whilst in use.

The rotation of the reflection suppression device 1000, 1800 may be such that the maximum rotation is constrained by contact between the reflection suppression device 1000, 1800 and the optical combiner 650, as shown in FIG. 32. This maximum rotation is less than 90°, ensuring that gravity will naturally return the reflection suppression device 1000, 1800 to its correct place before use.

Channel Optimization

Figure 33:
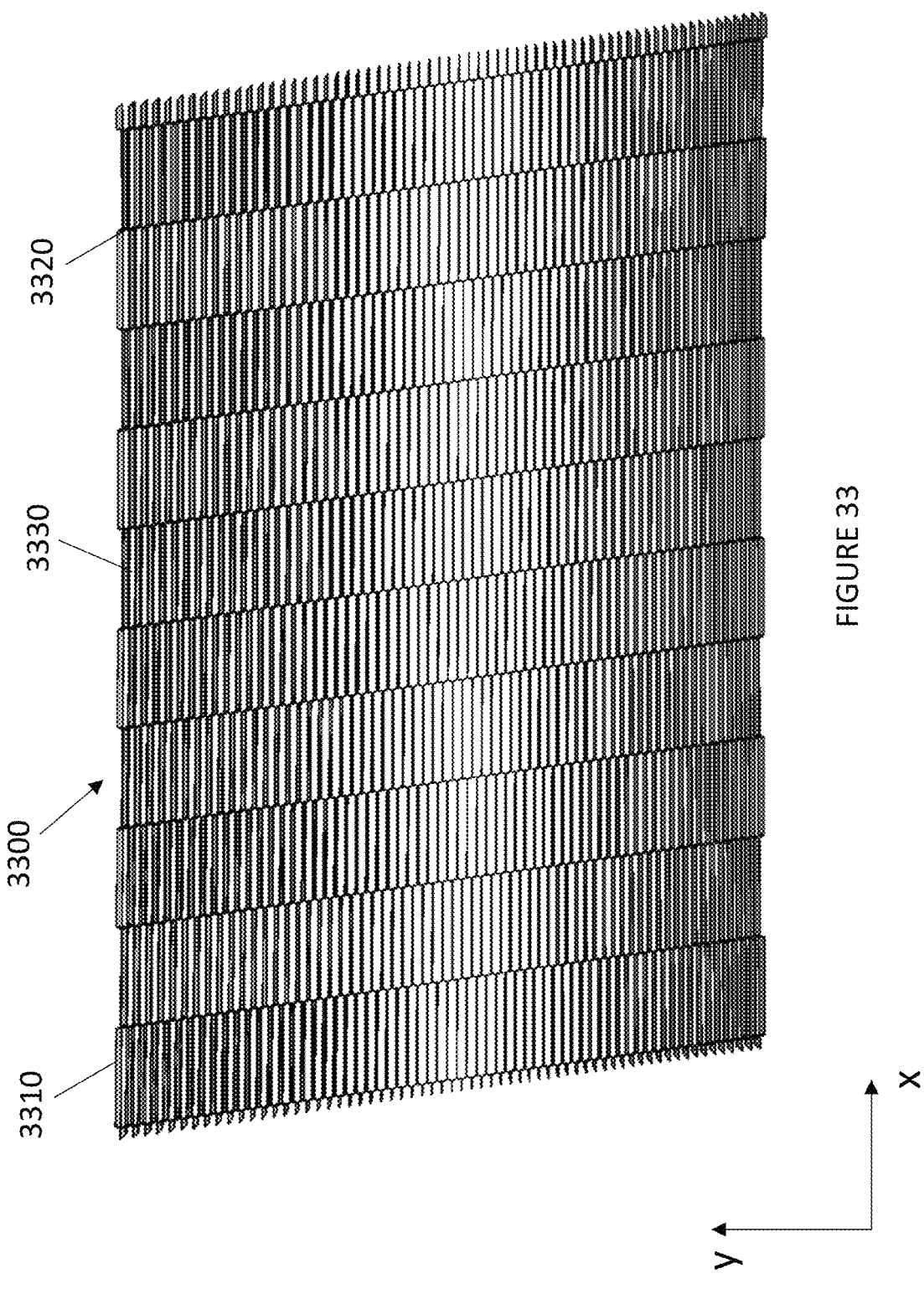
FIG. 33 is a schematic plan view of a reflection suppression device according to a fourth embodiment of the present disclosure.
Figures 34, 35:
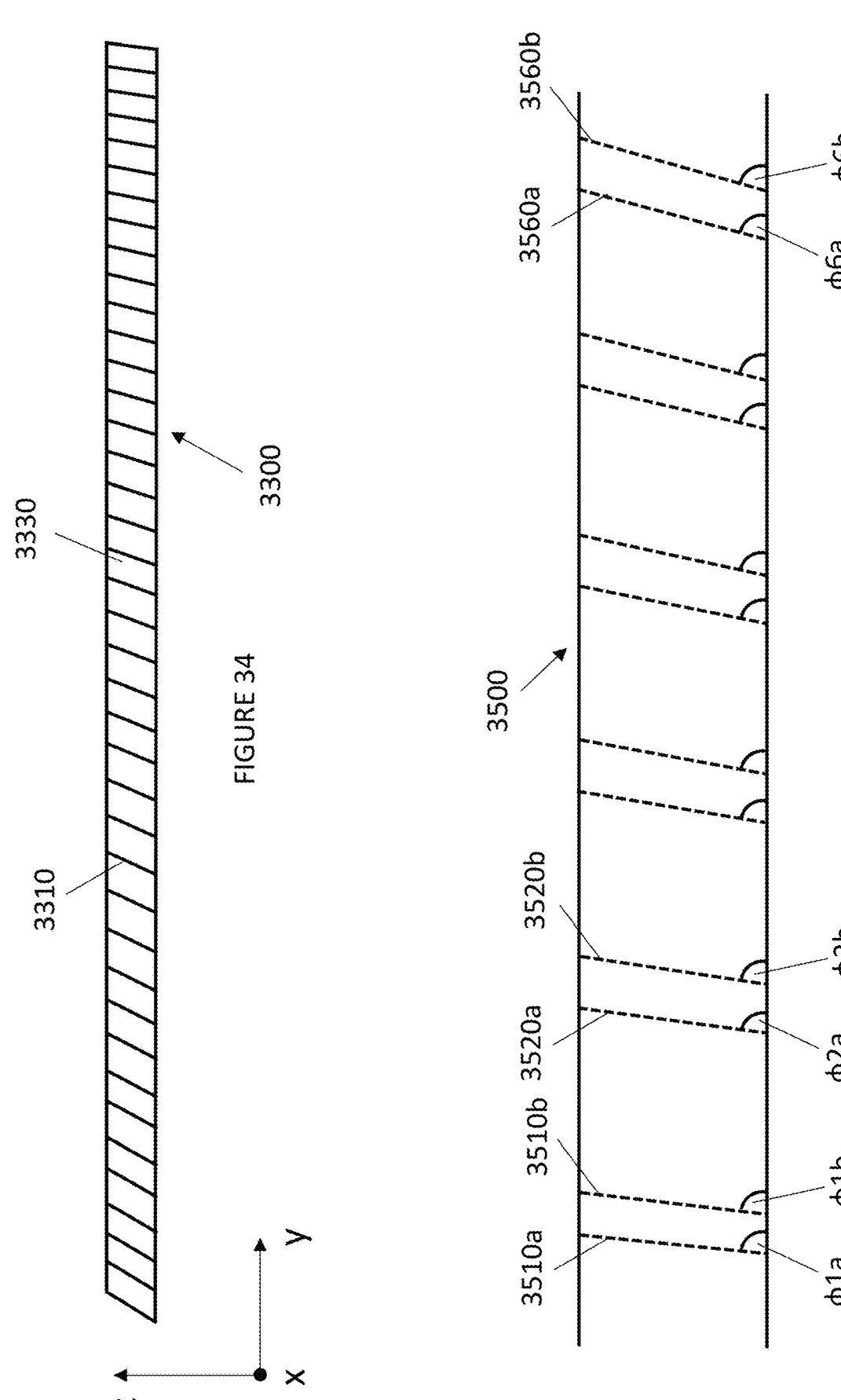
FIG. 34 is a schematic side view of the reflection suppression device of FIG. 33.
FIG. 35 is a schematic view of a step of a method of manufacturing the reflection suppression device of FIGS. 33 and 34.

FIGS. 33 and 34 show a variation wherein the effect of the "arched reflection suppression device" as described above is achieved with a substantially planar reflection suppression device 3300, wherein each side or wall is at a different orientation angle, to account for the different angles at which the light is emitted from the output surface 642.

The reflection suppression device 3300 shown in FIGS. 33 and 34 are variations of FIGS. 12 and 10 respectively. As can be seen in FIGS. 33 and 34, the orientation of the first and second sides/walls 3310, 3320 vary across the reflection suppression device 3300. This changes an axis or direction of extension of each lattice element 3330 (that is, the axis or direction of the channels or openings through the reflection suppression device 3300).

As such, similar to as discussed above in relation to FIGS. 29 to 31, the variation of the orientation angles of the sides/walls of the reflection suppression device 3300 about both the x- and y-axes allows each lattice element 3330 (i.e., each channel or opening) to be angled in a direction closer to the angle of the image light emitted from the output surface at that point across the output surface. By more closely aligning the lattice elements 3330 with the orientation angle of image light emitted from each point across the output surface, less image light will be blocked by both the first and second sides/walls 3310, 3320, reducing the occlusions produced.

Thus, this embodiment provides optical performance improvements across the reflection suppression device 3300 in both the x- and y-directions, without needing to curved or arch the reflection suppression device 3300.

Strip Folding and Spot-Welding for Channel Optimisation

Figures 36, 37:
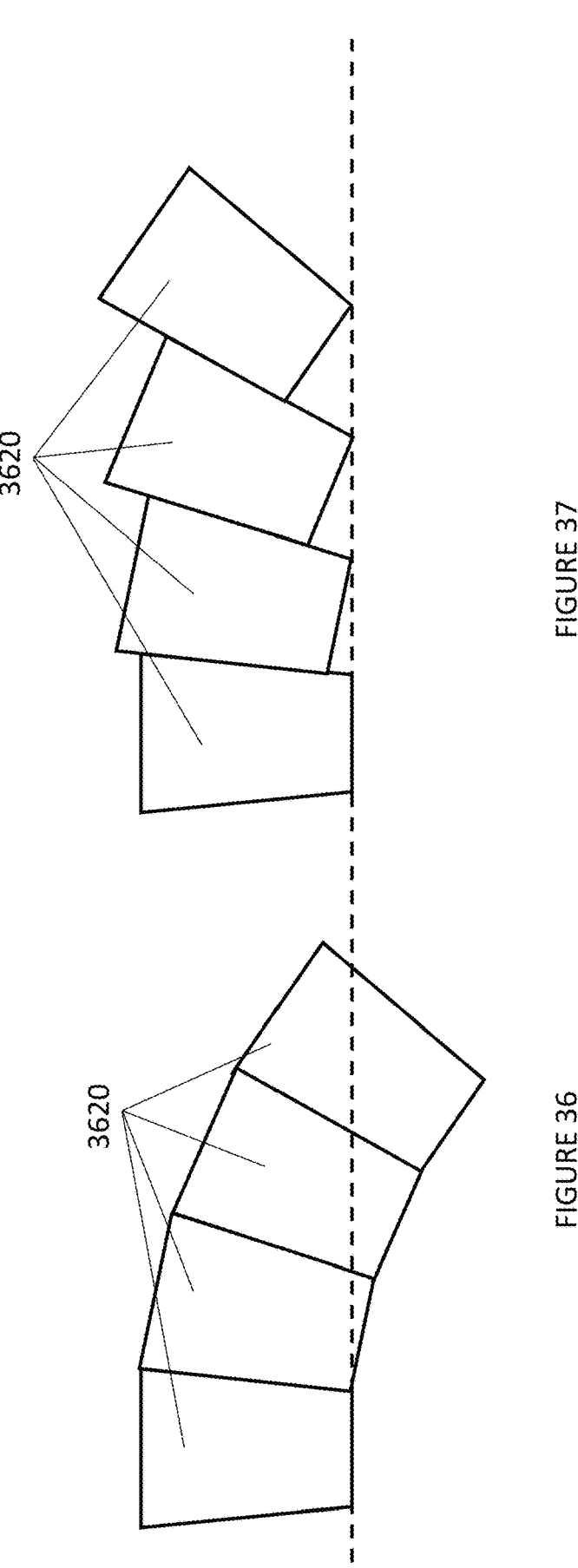
FIG. 36 is a schematic view of a further step of a method of manufacturing the reflection suppression device of FIGS. 33 and 34.
FIG. 37 is a schematic view of a variation of the step of FIG. 36.

FIGS. 35 to 37 schematically show a variation of the method of manufacturing described above in relation to FIG. 17 that can be used to manufacture the reflection suppression device 3300. FIG. 35 shows an elongate member 3500—i.e., a single strip of material—with a plurality of dashed fold lines 3510a-3560b that are used to form the first portions 1710a and second portions 1710b separated by connecting portions 1720 (as described above in relation to FIG. 17). That is, a first pair of fold lines 3510a, 3510b define a connecting portion 1720. As discussed above in relation to FIG. 17, the elongate members 3500 are arranged and joined such that the connecting portions 1720 (i.e., the areas defined by the pairs of fold lines 3510-3560) form the second/side walls 3320 of the reflection suppression device 3300. Meanwhile, a fold line 3510b together with the next fold line 3520a in the next pair of fold lines define a first or second portion 1710a, 1710b. As also discussed above in relation to FIG. 17, the elongate members 3500 are arranged and joined such that the first and second portions 1710a, 1710b (i.e., the areas defined between the pairs of fold lines 3510-3560) form the first walls/sides 3310 of the reflection suppression device 3300.

Each fold line 3510-3560 is at a respective angle φ1-6 relative to the length of the elongate member 3500. The inventors have found that by varying the fold angle φ1-6 for each fold line, the variation of the orientation angles of the sides/walls of the reflection suppression device 3300 about both the x- and y-axes, as described above, can be achieved. Specifically, it is the difference in fold angle φ1-6 that defines each portion 1710a, 1710b, 1720 (in other words, the shape of the trapezium that is each portion 1710a, 1710b, 1720).

That is, the difference in fold angles φxa, φxb for each pair of fold lines 35x0a, 35x0b defines the variation in orientation angle in the x-direction, whilst the difference in fold angles φxb, φ(x+1) b for a fold line 35x0b and the fold line 35(x+1)0a of the next pair of fold lines defines the variation in orientation angle in the y-direction. In other words, the difference between the fold angles φ1a, φ1b of the first pair of fold angles may be in the range of 0° to 0.03°, which may be the same as the difference between each pair of fold angles φxa, φxb. This angle defines the variation in the x-direction (as in FIG. 33). Meanwhile, the difference between the fold angles φ1b and φ2a may be in the range of 0° to 0.3°, which may be the same as the different between the fold angles 2b and 03a, and so on. This angle defines the variation in the y-direction (as in FIG. 33).

Each elongate member 3500 is then combined as described above in relation to FIG. 17. The inventors realised that, due to the uneven fold angles of each connecting portion 1720, the side/second walls 3620 produce an arched pattern, as schematically shown in FIG. 36. As it may be preferable to have the reflection suppression device 3300 be (substantially) planar, the inventors realised that they could attach the elongate members 3500 as shown in FIG. 37. By not attaching the elongate members 3500 such that the first and second portions line up exactly (i.e., so the side/second faces 3620 do not line up exactly), a substantially planar structure can be preserved.

The skilled person would understand that FIGS. 33 to 37 are schematic in nature, and so may show exaggerated angles, shapes or sizes in an effort to clearly portray small changes in the structure of the reflection suppression device 3300.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

Enumerated Embodiments

Various aspects of the disclosure are illustrated by the following enumerated embodiments, which may be combined in any number and in any combination that is not technically or logically inconsistent.

Embodiment 1. A method of head-up display in a vehicle, the method comprising:

displaying a hologram of an image on a spatial light modulator;

illuminating the hologram displayed on the spatial light modulator to form spatially modulated light encoded with the hologram;

propagating the spatially modulated light to a scattering diffuser disposed at an image reconstruction plane of the hologram such that an image reconstruction of the image is output by the diffuser;

coupling the output of the scattering diffuser into an input port of a planar waveguide pupil expander;

replicating the image in a first direction and in a second direction to form an array of replicas of the image;

transmitting the array of replicas of the image through a plurality of tilted channels of a reflection suppression device disposed on top of the waveguide pupil expander, wherein each tilted channel of the plurality of channels is tilted from vertical by a first angle in the first direction of the array of replicas and tilted from vertical by a second angle in the second direction of the array of replicas, wherein the first angle of the tilted channels increases with distance in the first direction;

relaying the plurality of replicas of the image to an eye-box of the head-up display using the windscreen of the vehicle; and simultaneously with the transmitting, blocking sunlight on an optical path to the eye-box via the waveguide pupil expander using the walls of the tilted channels.

Embodiment 2. The method of Embodiment 1 wherein the first angle increases with distance in the first direction from being in the range 15 to 35 degrees on one side (e.g., the first side) to being in the range 25 to 45 degrees on the other side (e.g., the second side).

Embodiment 3. The method of Embodiment 1 or Embodiment 2, wherein the first angle increases with distance in the first direction from a value on one side (e.g., the first side) to a value on the other side (e.g., the second side) being at least 3 degrees greater than the value on the one side, e.g., at least 5 degrees greater, or at least 10 degrees greater.

Embodiment 4. The method of any of Embodiments 1-3, wherein the second angle increases with distance in the second direction.

Embodiment 5. The method of Embodiment 4 wherein the second angle increases with distance in the second direction from being in the range 5 to 15 degrees on one side (e.g., a first side thereof) to 15 to 30 degrees on the other side (e.g., a second side thereof).

Embodiment 6. The method of Embodiment 4 or Embodiment 5, wherein the second angle increases with distance in the second direction from a value on one side (e.g., a first side thereof) to a value on the other side (e.g., a second side thereof) being at least 3 degrees greater than the value on the one side, e.g., at least 5 degrees greater, or at least 10 degrees greater.

Embodiment 7. The method of any of Embodiments 1-6 wherein the first direction corresponds to a horizontal dimension of the image and the second direction corresponds to a vertical direction of the image.

Embodiment 8. The method of any of Embodiments 1-7, wherein the first direction is at an angle of 20 to 35 degrees to the horizontal dimension of the image, after relaying using the windscreen, and the second direction corresponds to the vertical direction of the image.

Embodiment 9. The method of any of Embodiments 1-8, wherein at least one of the tilted channels is substantially parallel to a gut ray of the image.

Embodiment 10. The method of any of Embodiments 1-9, wherein the tilted channels have the same size and/or shape.

Embodiment 11. The method of any of Embodiments 1-10, wherein the tilted channels of the reflection suppression device are provided in a plurality of rows of channels, in which channels of each row are offset from channels of a neighbouring row.

Embodiment 12. The method of any of Embodiments 1-11, wherein the reflection suppression device is curved about a first axis parallel to its plane.

Embodiment 13. A head-up display for a vehicle, the head-up comprising:

a spatial light modulator arranged to display a hologram of an image;

a light source arranged to illuminate the hologram displayed on the spatial light modulator to form spatially modulated light encoded with the hologram;

a diffuser disposed at an image reconstruction plane of the hologram such that an image reconstruction of the image is formed thereon;

an input port arranged to receive the image reconstructed on the diffuser; and a pair of opposing reflective surfaces arranged to waveguide the image therebetween by internal reflection to form a plurality of replicas of the image for transmission to the viewing window, wherein a first surface of the pair of opposing reflective surfaces is partially transmissive thereby forming an output port for a plurality of replicas of the image;

wherein the first surface is arranged, during operation of the head-up display, on an optical path of sunlight from the waveguide to the viewing window; and a reflection suppression device arranged on the optical path of the sunlight to the first surface of the waveguide, the reflection suppression device comprising a plurality of tilted channels, wherein each tilted channel of the plurality of channels is tilted from vertical by a first angle in the first direction of the array of replicas and tilted from vertical by a second angle in the second direction of the array of replicas, wherein the first angle of the tilted channels increases with distance in the first direction.

Embodiment 14. The head-up display of Embodiment 13 wherein the first angle increases with distance in the first direction from being in the range 15 to 35 degrees on one side to being in the range 25 to 45 degrees on the other side.

Embodiment 15. The head-up display of Embodiment 13 or Embodiment 14, wherein the first angle increases with distance in the first direction from a value on one side to a value on the other side being at least 3 degrees greater than the value on the one side, e.g., at least 5 degrees greater, or at least 10 degrees greater.

Embodiment 16. The head-up display of any of Embodiments 13-15, wherein the second angle increases with distance in the second direction.

Embodiment 17. The head-up display of Embodiment 16 wherein the second angle increases with distance in the second direction from being in the range 5 to 15 degrees on one side to 15 to 30 degrees on the other side.

Embodiment 18. The head-up display of Embodiment 16 or Embodiment 17, wherein the second angle increases with distance in the second direction from a value on one side to a value on the other side being at least 3 degrees greater than the value on the one side, e.g., at least 5 degrees greater, or at least 10 degrees greater.

Embodiment 19. The head-up display of any of Embodiments 13-18, wherein the first direction corresponds to a horizontal dimension of the image and the second direction corresponds to a vertical direction of the image.

Embodiment 20. The head-up display of any of Embodiments 13-19, wherein the first direction is at an angle of 20 to 35 degrees to the horizontal dimension of the image, after relaying using the windscreen, and the second direction corresponds to the vertical direction of the image.

Embodiment 21. The head-up display of any of Embodiments 13-20, wherein at least one of the tilted channels is substantially parallel to a gut ray of the image.

Embodiment 22. The head-up display of any of Embodiments 13-21, wherein the tilted channels have the same size and/or shape.

Embodiment 23. The head-up display of any of Embodiments 13-22, wherein the tilted channels of the reflection suppression device are provided in a plurality of rows of channels, in which channels of each row are offset from channels of a neighbouring row.

Embodiment 24. The head-up display of any of Embodiments 13-23, wherein the reflection suppression device is curved about a first axis parallel to its plane.

Embodiment 25. A method of forming a reflection suppression device comprising a lattice structure extending in a first direction and a second direction, the first direction being perpendicular to the second direction, the method comprising:

i. providing a plurality of elongate members, each elongate member being formed of a thin and narrow sheet of material;

ii. processing each elongate member to form a plurality of lattice members, each lattice member comprising an alternating array of front walls and back walls adjoined by side walls, the processing of each elongate member to form a lattice member comprising:

a. folding the elongate member at a first fold line of a plurality of fold lines in first direction of fold;

b. folding the elongate member at a second fold line of the plurality of fold lines in a second direction of fold, such that the first and second fold lines define a wall; and c. repeating steps a and b, wherein an angle of the fold line on the elongate member changes every other fold line along the elongate member;

iii. attaching the front walls of a first lattice member of the plurality of lattice members to corresponding back walls of a second lattice member of the plurality of lattice members;

iv. attaching the front walls of the second lattice member to the corresponding back walls of a third lattice member of the plurality of lattice members; and v. repeating steps iii and iv for each of the plurality of lattice members to form the lattice structure, each set of a front wall, back wall and pair of side walls defining an array of channels, each channel defined by a respective channel axis having a first angle in the first direction and second angle in the second direction;

wherein each lattice member extends in the second direction and wherein the change of angle of the fold line on the elongate member every other fold line along the elongate member of step c is such that the first angle of each channel axis is a function of the first direction such that the values of the first angle is dependent on the position of the channel axis across the lattice structure in the first direction.

Embodiment 26. The method as claimed in Embodiment 25, wherein step c further comprises changing an angle of the fold line on the elongate member every fold line along the elongate member such that the second angle of each channel axis is a function of the second direction such that the values of the second angle is dependent on the position of the channel axis across the lattice structure in the second direction.

Embodiment 27. The method as claimed in Embodiment 25 or Embodiment 26, wherein the distance between each fold line from the subsequent fold line of step ii alternates between a first distance and a second distance.

Embodiment 28. The method as claimed in Embodiment 27, wherein the fold lines separated by the first distance define the side walls and the fold lines separated by the second distance define the front and back walls.

Embodiment 29. The method as claimed in any of Embodiments 25-28, wherein a change in angle between an adjacent pair of fold lines separated by the first distance is in the range of 0° to 0.03°, such as 0.01° to 0.015°.

Embodiment 30. The method as claimed in any of Embodiments 25-29, wherein a change in angle between an adjacent pair of fold lines separated by the second distance is in the range of 0° to 0.3°, such as 0.1° to 0.2°.

Embodiment 31. The method as claimed in any of Embodiments 25-30, wherein the magnitude of each fold of step ii is substantially 90°.

Embodiment 32. The method as claimed in any of Embodiments 25-31, wherein the folding of step ii is achieved using die stamping.

Embodiment 33. The method as claimed in any of Embodiments 25-32, wherein the lattice members are attached in steps iii to v such that the side walls of each lattice member are substantially aligned with the side walls of the adjacent lattice members.

Embodiment 34. The method as claimed in any of Embodiments 25-33, wherein the lattice members are attached in steps iii to v such that the lattice structure is substantially planar.

Embodiment 35. The method as claimed in any of Embodiments 25-34, wherein each lattice member is substantially the same.

Embodiment 36. The method as claimed in any of Embodiments 25-35, wherein the lattice members are attached to one another in steps iii to v using welding.

It will be apparent to those skilled in the art that various modifications and variations can be made without departing from the scope of the appended claims. The present disclosure covers all modifications and variations within the scope of the appended claims and their equivalents.

What is claimed is:

1. A method of head-up display in a vehicle, the method comprising:

displaying a hologram of an image on a spatial light modulator;

illuminating the hologram displayed on the spatial light modulator to form spatially modulated light encoded with the hologram;

propagating the spatially modulated light to a scattering diffuser disposed at an image reconstruction plane of the hologram to provide a reconstructed image on the diffuser and provide the reconstructed image as an output of the scattering diffuser;

coupling the output of the scattering diffuser into an input port of a planar waveguide pupil expander;

replicating the reconstructed image to form an array of replicas of the reconstructed image, the array having a first direction and a second direction;

transmitting the array of replicas of the reconstructed image through a plurality of tilted channels of a reflection suppression device disposed on top of the planar waveguide pupil expander, wherein each tilted channel of the plurality of channels is tilted from vertical by a first angle in the first direction of the array of replicas and tilted from vertical by a second angle in the second direction of the array of replicas, wherein the first angle of the tilted channels increases with distance in the first direction;

relaying the plurality of replicas of the reconstructed image to an eye-box of the head-up display using a windscreen of the vehicle; and simultaneously with the transmitting, blocking sunlight on an optical path to the eye-box via the planar waveguide pupil expander using walls of the tilted channels.

2. The method of claim 1 wherein the first angle increases with distance in the first direction from being in the range 15 to 35 degrees on a first side to being in the range 25 to 45 degrees on a second the other side.

3. The method of claim 1, wherein the first angle increases with distance in the first direction from a value on a first side to a value on a second side that is at least 3 degrees greater than the value on the first side.

4. The method of claim 3, wherein the second angle increases with distance in the second direction.

5. The method of claim 4 wherein the second angle increases with distance in the second direction from being in the range 5 to 15 degrees on a first side to 15 to 30 degrees on a second the other side.

6. The method of claim 4, wherein the second angle increases with distance in the second direction from a value on a first side to a value on a second side that is at least 5 degrees greater than the value on the first side.

7. The method of claim 3, wherein the first direction corresponds to a horizontal dimension of the image and the second direction corresponds to a vertical direction of the image.

8. The method of claim 3, wherein the first direction is at an angle of 20 to 35 degrees to a horizontal dimension of the image, after relaying using the windscreen, and the second direction corresponds to a vertical direction of the image.

9. The method of claim 3, wherein at least one of the tilted channels is substantially parallel to a gut ray of the image.

10. The method of claim 3, wherein the tilted channels have the same size and/or shape.

11. The method of claim 3, wherein the tilted channels of the reflection suppression device are provided in a plurality of rows of channels, in which channels of each row are offset from channels of a neighboring row.

12. The method of claim 3, wherein the reflection suppression device is curved about a first axis parallel to its plane.

13. The method of claim 1, wherein the first angle increases with distance in the first direction from a value on a first side to a value on a second side that is at least 5 degrees greater than the value on the first side.

14. The method of claim 1, wherein the first angle increases with distance in the first direction from a value on a first side to a value on a second side that is at least 10 degrees greater than the value on the first side.

15. The method of claim 1, wherein the second angle increases with distance in the second direction from a value on a first side to a value on a second side that is at least 5 degrees greater than the value on the first side.

16. The method of claim 1, wherein the first direction is at an angle of 20 to 35 degrees to a horizontal dimension of the image, after relaying using the windscreen, and the second direction corresponds to a vertical direction of the image.

17. The method of claim 1, wherein at least one of the tilted channels is substantially parallel to a gut ray of the image.

18. The method of claim 1, wherein the tilted channels of the reflection suppression device are provided in a plurality of rows of channels, in which channels of each row are offset from channels of a neighboring row.

19. A head-up display for a vehicle, the head-up comprising:

a spatial light modulator arranged to display a hologram of an image;

a light source arranged to illuminate the hologram displayed on the spatial light modulator to form spatially modulated light encoded with the hologram;

a diffuser disposed at an image reconstruction plane of the hologram and arranged to receive the spatially modulated such that a reconstructed image is formed thereon;

a planar waveguide pupil expander comprising:

an input port arranged to receive the reconstructed image from the diffuser; and a pair of opposing reflective surfaces arranged to waveguide the reconstructed image therebetween by internal reflection to form a plurality of replicas of the reconstructed image for transmission to a viewing window, wherein a first surface of the pair of opposing reflective surfaces is partially transmissive thereby forming an output port for a plurality of replicas of the reconstructed image;

wherein the first surface is arranged, during operation of the head-up display, on an optical path of sunlight from the planar waveguide pupil expander to the viewing window; and a reflection suppression device arranged on the optical path of the sunlight to the first surface of the planar waveguide pupil expander, the reflection suppression device comprising a plurality of tilted channels, wherein each tilted channel of the plurality of channels is tilted from vertical by a first angle in a first direction of the array of replicas and tilted from vertical by a second angle in a second direction of the array of replicas, wherein the first angle of the tilted channels increases with distance in the first direction.

20. The head-up display of claim 19, wherein the first angle increases with distance in the first direction from being in the range 15 to 35 degrees on a first side to that is in the range 25 to 45 degrees on a second side.

21. The head-up display of claim 19, wherein the first angle increases with distance in the first direction from a value on a first side to a value on a second side that is at least 5 degrees greater than the value on the first side.

22. The head-up display of claim 21, wherein the second angle increases with distance in the second direction.

23. The head-up display of claim 22 wherein the second angle increases with distance in the second direction from being in the range 5 to 15 degrees on a first side to 15 to 30 degrees on a second.

24. The head-up display of claim 22, wherein the second angle increases with distance in the second direction from a value on a first side to a value on a second the other side being at least 3 degrees greater than the value on the first side.

25. The head-up display of claim 21, wherein the first direction corresponds to a horizontal dimension of the image and the second direction corresponds to a vertical direction of the image.

26. The head-up display of claim 21, wherein the first direction is at an angle of 20 to 35 degrees to a horizontal dimension of the image, after relaying using a windscreen, and the second direction corresponds to a vertical direction of the image.

27. The head-up display of claim 21, wherein at least one of the tilted channels is substantially parallel to a gut ray of the image.

28. The head-up display of claim 21, wherein the tilted channels have the same size and/or shape.

29. The head-up display of claim 21, wherein the tilted channels of the reflection suppression device are provided in a plurality of rows of channels, in which channels of each row are offset from channels of a neighboring row.

30. The head-up display of claim 21, wherein the reflection suppression device is curved about a first axis parallel to its plane.

* * * * *